US011435489B2

(12) United States Patent
Mino et al.

(10) Patent No.: US 11,435,489 B2
(45) Date of Patent: Sep. 6, 2022

(54) SEISMIC SENSOR AND EARTHQUAKE DETERMINATION METHOD

(71) Applicant: Omron Corporation, Kyoto (JP)

(72) Inventors: Hiroyuki Mino, Osaka (JP); Naotsugu Ueda, Funabashi (JP); Masakazu Suzuki, Takatsuki (JP)

(73) Assignee: Omron Corporation, Kyoto (JP)

( * ) Notice: Subject to any disclaimer, the term of this patent is extended or adjusted under 35 U.S.C. 154(b) by 413 days.

(21) Appl. No.: 16/606,016

(22) PCT Filed: Mar. 12, 2018

(86) PCT No.: PCT/JP2018/009371
§ 371 (c)(1),
(2) Date: Oct. 17, 2019

(87) PCT Pub. No.: WO2019/003505
PCT Pub. Date: Jan. 3, 2019

(65) Prior Publication Data
US 2021/0141107 A1    May 13, 2021

(30) Foreign Application Priority Data

Jun. 30, 2017  (JP) .............................. JP2017-129954

(51) Int. Cl.
*G01V 1/00* (2006.01)
*G01V 1/16* (2006.01)
(52) U.S. Cl.
CPC .............. *G01V 1/008* (2013.01); *G01V 1/164* (2013.01)
(58) Field of Classification Search
CPC ................... G01V 1/008; G01V 1/164; G01V 2210/1232; G01V 1/18; G08B 21/10; G08B 29/185
See application file for complete search history.

(56) References Cited

U.S. PATENT DOCUMENTS 10,613,240 B2 *  4/2020  Ueda ..................... G01V 1/162
10,739,476 B2 *  8/2020  Sakuma ................. G01V 1/164
(Continued)

FOREIGN PATENT DOCUMENTS

CN    105676269 A    6/2016
CN    106297196 A    1/2017
(Continued)

OTHER PUBLICATIONS

Office Action issued in Chinese Application No. 201880023980.3; dated Aug. 4, 2021 (35 pages).
(Continued)

*Primary Examiner* — Daniel Pihulic
(74) *Attorney, Agent, or Firm* — Osha Bergman Watanabe & Burton LLP

(57) ABSTRACT

Provided is a technique that can more reliably suppress erroneous determination of noise as an earthquake, in a seismic sensor. The seismic sensor operates in a power saving mode and a measurement mode with higher power consumption than that of the power saving mode. The seismic sensor includes: a measurement unit configured to measure acceleration; an earthquake determination unit configured to determine whether or not an earthquake has occurred based on the acceleration measured in a predetermined determination period after shifting to the measurement mode when shifting from the power saving mode to the measurement mode in a case where acceleration measured by the measurement unit exceeds a predetermined threshold; and an index calculator configured to calculate an index value indicating a scale of an earthquake in an earthquake processing period after the predetermined determination period, when the earthquake determination unit determines that an earthquake has occurred. The earthquake determination unit determines an occurrence of an earthquake based (Continued)

on the presence or absence of a pulse waveform in a waveform of acceleration measured in the determination period, and/or a frequency characteristic or a convergence characteristic after the pulse waveform in a waveform of the acceleration.

6 Claims, 21 Drawing Sheets

(56) References Cited

U.S. PATENT DOCUMENTS

| | | | |
|---|---|---|---|
| 2017/0003406 | A1 | 1/2017 | Ueda et al. |
| 2018/0188396 | A1 | 7/2018 | Sakuma et al. |
| 2020/0012003 | A1* | 1/2020 | Mino .................. G01V 1/18 |
| 2021/0124070 | A1* | 4/2021 | Mino .................. G01V 1/008 |
| 2021/0141107 | A1* | 5/2021 | Mino .................. G08B 21/10 |

FOREIGN PATENT DOCUMENTS

| | | | | |
|---|---|---|---|---|
| EP | 3598179 | A1 | 1/2020 | |
| EP | 3647825 | A1 * | 5/2020 | ............. G01V 1/008 |
| JP | H3-291536 | A | 12/1991 | |
| JP | H11248846 | A | 9/1999 | |
| JP | 200343154 | A | 2/2003 | |
| JP | 2003164056 | A | 6/2003 | |
| JP | 2006105759 | A | 4/2006 | |
| JP | 2010151628 | A | 7/2010 | |
| JP | 5375435 | B2 | 12/2013 | |
| JP | 2015148539 | A | 8/2015 | |
| JP | 201715603 | A | 1/2017 | |
| JP | 201715604 | A | 1/2017 | |
| WO | WO-2019003505 | A1 * | 1/2019 | ............. G01V 1/008 |

OTHER PUBLICATIONS

International Search Report issued in International Application No. PCT/JP2018/009371, dated May 22, 2018 (2 pages).
Written Opinion issued in International Application No. PCT/JP2018/009371; dated May 22, 2018 (8 pages).
Yayong Wang,"A Real-time Seismic Signal Detection Method based on Energy Spectrum" China Earthquake, vol. 2, No. 1 issued on Dec. 31, 1986 (10 pages).
Office Action issued in Chinese Application No. 201880023980.3; dated Oct. 26, 2020 (17 pages).
International Preliminary Report on Patentability issued in International Application No. PCT/JP2018/009371; dated Jan. 2, 2020 (7 pages).
Extended European Search Report issued in European Application No. 18823626.9, dated Mar. 2, 2021 (9 pages).

* cited by examiner

Fig. 9

| | One time determination period | Repeatedly executed determination period |
|---|---|---|
| With condition of 700 gal or more | Process returns to standby state when, in first determination period, there is maximum acceleration value of 700 gal or more and then acceleration value (including offset correction) of ±50 gal or less occurs continuously for 10 times.<br>This is prioritized over condition of less than 100 gal in earthquake determination. | Daily life vibration state is determined when, in first determination period, there is maximum acceleration of 700 gal or more, MAX - MIN is determined to be less than 100 gal, and acceleration value (including offset correction) of ±50 gal or less occurs continuously for 10 times. Earthquake determination is repeated in case of daily life vibration state. SI value is reset once in case of daily life vibration state. |
| Without condition of 700 gal or more | Process returns to standby state when, in first determination period, MAX - MIN is determined to be less than 100 gal, or acceleration value of ±50 gal or less occurs continuously for 10 times.<br>However, offset value is not updated in case of MAX - MIN less than ±100 gal and ±50 gal or less continuous for 10 times. | Daily life vibration state is determined when, in first determination period, MAX - MIN is determined to be less than 100 gal, and acceleration value (including offset correction) of ±50 gal or less occurs continuously for 10 times. Earthquake determination is repeated in case of daily life vibration state. SI value is reset once in case of daily life vibration state. |

Fig. 13
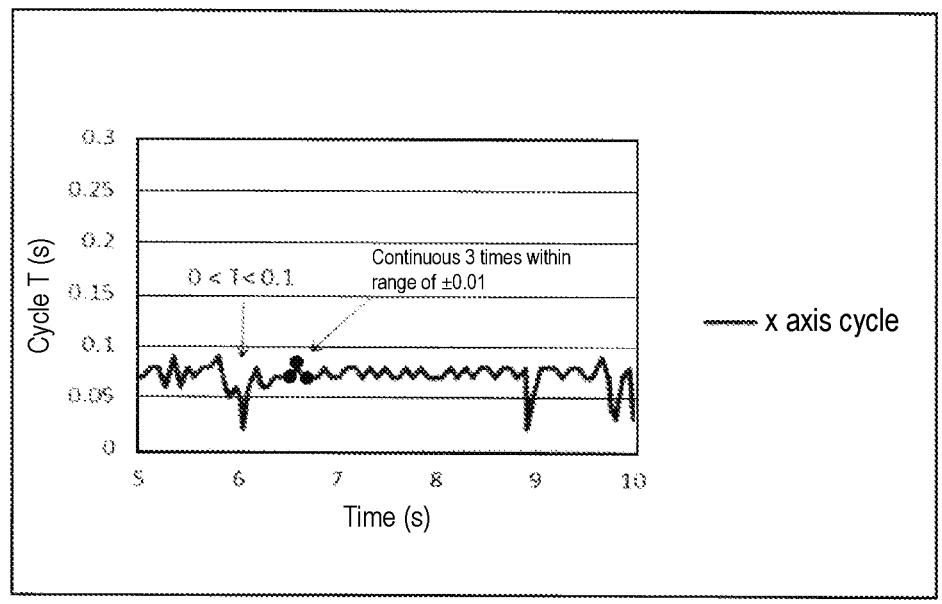
(a)
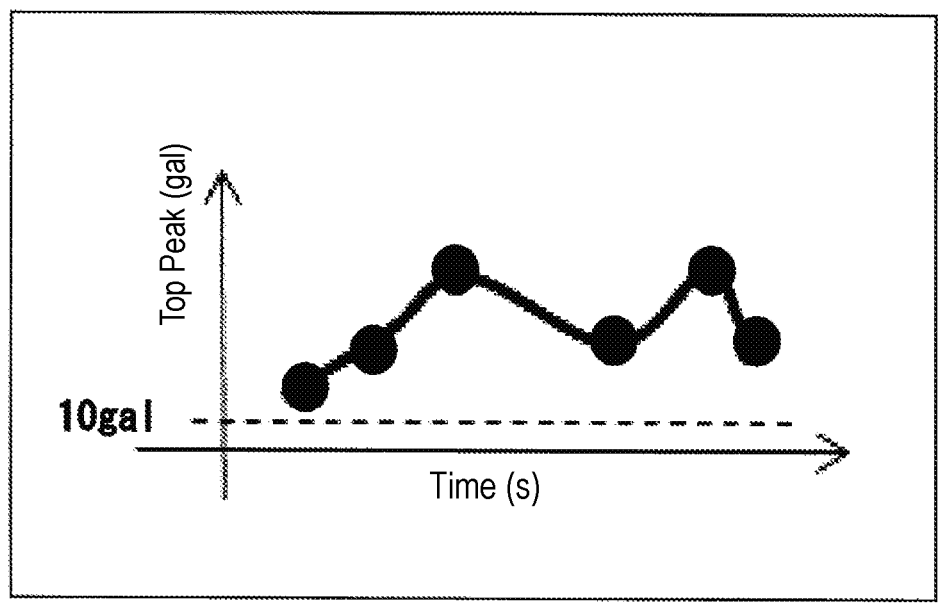
(b)

Fig. 14
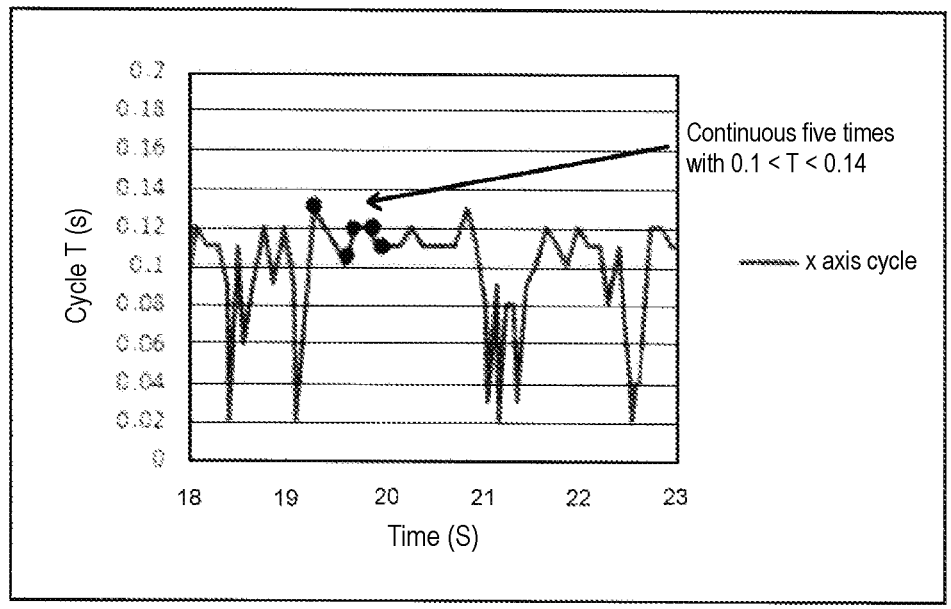
(a)
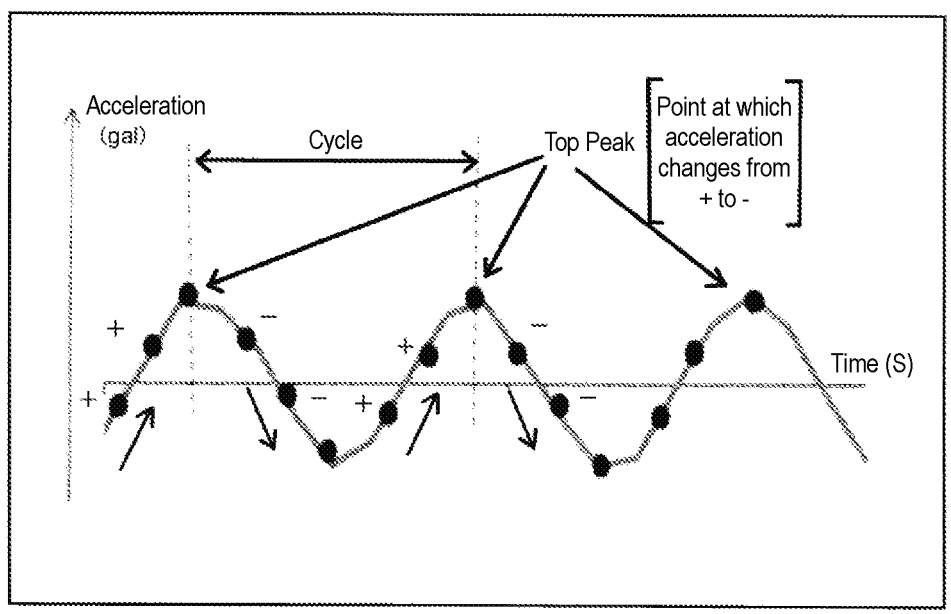
(b)

Fig. 20
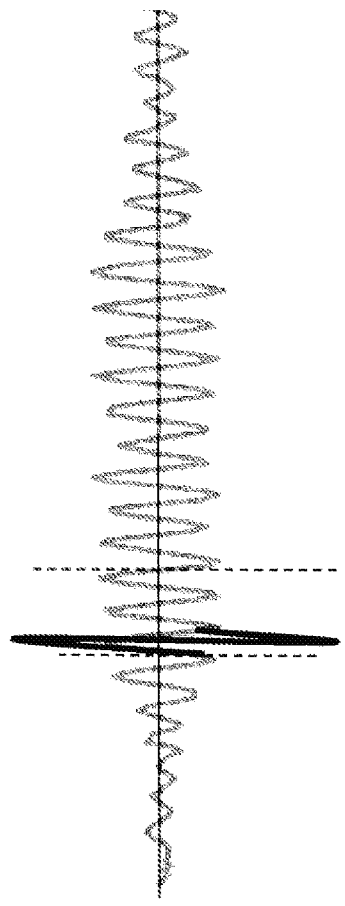
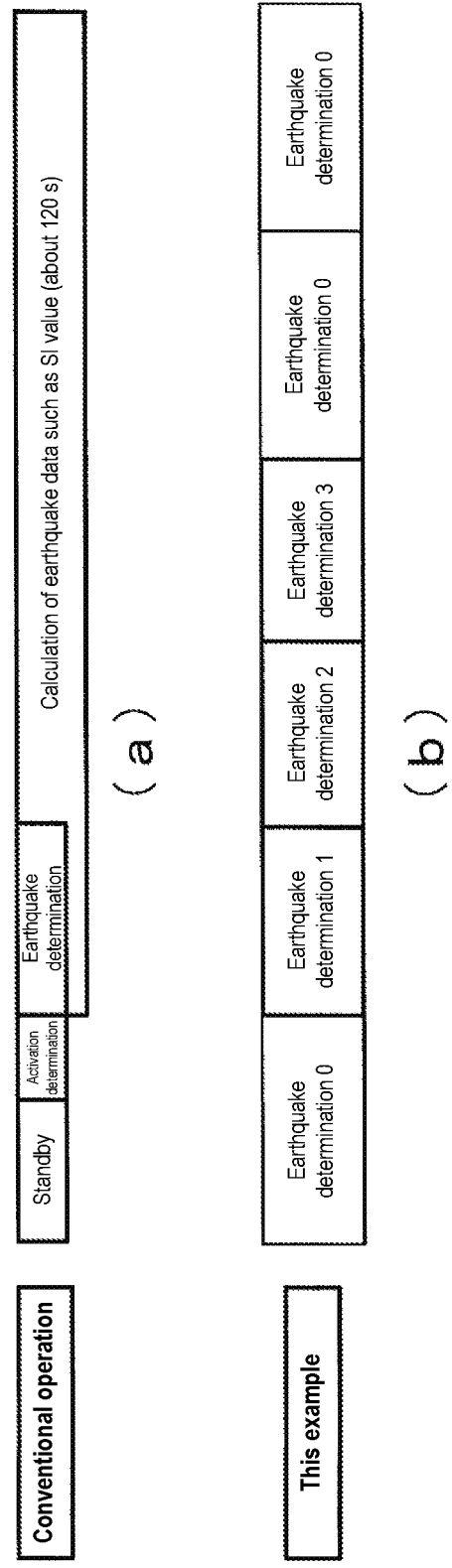

SEISMIC SENSOR AND EARTHQUAKE DETERMINATION METHOD

TECHNICAL FIELD

The present invention relates to a seismic sensor and an earthquake determination method.

BACKGROUND ART

In a case of a device that is provided in a meter box or the like and is driven by a battery, for example, such as a seismic sensor used to shut off gas and electricity when an earthquake occurs, it is particularly desirable to reduce standby power. However, while a seismic sensor using a microcontroller can obtain an index value for evaluating a scale of an earthquake through arithmetic processing, power consumption tends to increase as compared with a mechanical seismic sensor that is energized in response to vibration, which has been conventionally used. In addition, depending on an environment in which the device is installed, noise due to human-based vibration is also measured, and a degree of measured noise varies. Moreover, if such noise is repeatedly detected erroneously as an earthquake, the power consumption of the seismic sensor increases.

In this regard, there is proposed a technique for improving the accuracy of determination by performing earthquake determination after shifting from a power saving mode to a measurement mode, and filtering measured acceleration in the seismic sensor that returns to the power saving mode, to remove a noise component when it is determined as not an earthquake (for example, Patent Document 1).

PRIOR ART DOCUMENT

Patent Document

Patent Document 1: Japanese Unexamined Patent Publication No. 2017-15604

SUMMARY OF THE INVENTION

Problems to be Solved by the Invention

Conventionally, the determination as to whether vibration measured by the seismic sensor is an earthquake or noise has been made based on vibration immediately after the seismic sensor shifts from a power saving mode to a measurement mode. However, as described above, a pulse impact caused by daily life vibration caused by human-based vibration or the like may have been erroneously detected as an earthquake. In addition, when it is determined that an earthquake having vibration intensity of a certain level or higher has occurred, a shut-off signal for shutting off energy supply such as gas or electricity may have been erroneously output, in some cases.

The present invention has been made in view of the above problems, and an object thereof is to provide a technique that can suppress erroneous determination of noise as an earthquake, in a seismic sensor.

Means for Solving the Problem

A seismic sensor according to the present invention includes: a measurement unit configured to measure acceleration;

an earthquake determination unit configured to determine whether or not an earthquake has occurred based on the acceleration measured in a determination period that is predetermined; and an index calculator configured to calculate an index value indicating a scale of an earthquake in an earthquake processing period after the determination period, when the earthquake determination unit determines that an earthquake has occurred.

In the seismic sensor, the earthquake determination unit determines an occurrence of an earthquake based on the presence or absence of a pulse waveform in a waveform of acceleration measured in the determination period, and/or a frequency characteristic or a convergence characteristic after the pulse waveform in a waveform of the acceleration.

Here, the earthquake determination unit can determine whether or not an earthquake has occurred, based on a characteristic relating to magnitude of acceleration in the determination period. However, it is known that when the cause of acceleration is an earthquake, not only the magnitude of acceleration is large, but also a specific frequency distribution is exhibited and a specific waveform continuity is exhibited. Therefore, even in a case where large acceleration equal to or larger than a threshold is detected, when the acceleration waveform in the determination period includes a pulse waveform, and the frequency characteristic and the convergence characteristic of the waveform after the pulse waveform are ones that are not seen in an actual earthquake, it is possible to determine that the acceleration waveform is not due to an earthquake.

In the present invention, based on the above principle, the earthquake determination unit is adapted to determine an occurrence of an earthquake based on the presence or absence of a pulse waveform in a waveform of acceleration measured in the determination period, and/or a frequency characteristic or a convergence characteristic after the pulse waveform in a waveform of the acceleration. This allows the earthquake determination unit to more reliably determine whether the cause of the obtained acceleration is an earthquake or other cause such as daily life vibration, making it possible to suppress erroneous determination of noise due to other cause as an earthquake, by the seismic sensor. As a result, it is possible to improve the earthquake detection accuracy of the seismic sensor. Note that the present invention may be applied to a seismic sensor that operates in a power saving mode and a measurement mode with higher power consumption than that of the power saving mode, and shifts from the power saving mode to the measurement mode when acceleration measured by the measurement unit exceeds a predetermined threshold, in which the determination period is a period after shifting to the measurement mode.

Further, in the present invention, the earthquake determination unit may determine that no earthquake has occurred, when a waveform of acceleration measured in the determination period includes a pulse waveform and/or a fixed cycle waveform having a fixed cycle following the pulse waveform.

Typically, when the cause of acceleration measured by the measurement unit is an earthquake, a waveform of the acceleration is a complex waveform including a plurality of frequencies. Whereas, a waveform measured in a case of daily life vibration due to human-based vibration and the like may include a fixed frequency waveform having a fixed cycle after the pulse waveform itself, based on a natural frequency of the seismic sensor and a facility installed with the seismic sensor.

Therefore, in the present invention, when a waveform of acceleration measured in the determination period includes a pulse waveform and/or a fixed cycle waveform having a fixed cycle following the pulse waveform, the earthquake determination unit determines that the acceleration is caused by daily life vibration and no earthquake has occurred. This can more reliably suppress erroneous determination of noise due to other cause as an earthquake, by the seismic sensor.

Further, in the present invention, the earthquake determination unit may determine that no earthquake has occurred, when a waveform of acceleration measured in the determination period includes a pulse waveform and/or a convergent waveform having a predetermined amplitude or less following the pulse waveform.

Here, when the cause of acceleration is an earthquake, the vibration continues for a certain period. However, the waveform measured in a case of daily life vibration due to human-based vibration or the like has a characteristic of converging in a short period depending on the installation environment. Therefore, in the present invention, the earthquake determination unit determines that the acceleration is caused by daily life vibration and no earthquake has occurred, when a waveform of acceleration measured in the determination period includes a pulse waveform and/or a convergent waveform having a predetermined amplitude or less following the pulse waveform. This can more reliably suppress erroneous determination of acceleration caused by human-based work near the seismic sensor as being caused by the earthquake, by the earthquake determination unit. As a result, it is possible to more reliably suppress erroneous determination of noise due to other cause as an earthquake, by the seismic sensor.

Further, in the present invention, in the seismic sensor according to any one of claims 1 to 3, in the earthquake processing period, when an index value calculated by the index calculator is equal to or larger than a predetermined threshold, a shut-off signal for shutting off an operation of a related device provided with the seismic sensor is output. The seismic sensor may further include:
an impact determination unit configured to determine an occurrence of an earthquake in the earthquake processing period; and
a shut-off determination unit configured to inhibit output of the shut-off signal regardless of the index value, when the impact determination unit determines that no earthquake has occurred.

Here, in a conventional seismic sensor, when the earthquake determination unit determines that an earthquake has occurred, an index calculator calculates an index value indicating a scale of the earthquake, in an earthquake processing period after the determination period. Then, when the calculated threshold is equal to or larger than a predetermined threshold, for example, a shut-off signal is output to a gas management device provided with the seismic sensor to shut off the gas. Whereas, in the present invention, the impact determination unit temporarily determines that an earthquake has occurred in the determination period for the earthquake determination, and continues determination as to whether or not an earthquake has occurred even after shifting to the earthquake processing period. Then, when the impact determination unit determines that no earthquake has occurred in the earthquake processing period, the shut-off determination unit inhibits output of the shut-off signal regardless of the index value.

Consequently, when noise other than an earthquake is erroneously determined as an earthquake in the determination period and shift is made to the earthquake processing period, the determination as to whether or not an earthquake has occurred continues in parallel with the calculation of the index value by the index calculator. Then, when it is determined that no earthquake has occurred in the earthquake processing period, the shut-off signal is not output regardless of the index value. As a result, it is possible to more reliably prevent shutting off of an operation of the related device such as a gas management device, when the seismic sensor erroneously determines noise due to other cause as an earthquake.

Further, in the present invention, the earthquake determination unit can set a plurality of determination periods. Then, when it is determined that no earthquake has occurred in the determination period, an occurrence of an earthquake may be further determined in the next determination period.

Consequently, even when it is determined that no earthquake has occurred in the determination period after shifting to the measurement mode, it is possible to further determine an occurrence of an earthquake in the next determination period without immediately returning to a standby state. As a result, the risk of erroneously determining an actual earthquake as noise and returning to the standby state can be more reliably reduced.

In addition, the present invention may be an earthquake determination method including: an earthquake determination step of measuring acceleration and determining whether or not an earthquake has occurred based on the acceleration measured in a determination period that is predetermined; and
an index calculation step of calculating an index value indicating a scale of an earthquake in an earthquake processing period after the determination period, when it is determined that an earthquake has occurred in the earthquake determination step.

In the earthquake determination method,
in the earthquake determination step, an occurrence of an earthquake is determined based on the presence or absence of a pulse waveform in a waveform of acceleration measured in the determination period, and/or a frequency characteristic or a convergence characteristic after the pulse waveform in a waveform of the acceleration. In this case, the present invention may be applied to an earthquake determination method that determines an occurrence of an earthquake in a power saving mode and a measurement mode with higher power consumption than that of the power saving mode, and shifts from the power saving mode to the measurement mode when measured acceleration exceeds a predetermined threshold, in which the determination period is a period after shifting to the measurement mode.

Further, in the present invention, in the earthquake determination step, it may be determined that no earthquake has occurred when a waveform of acceleration measured in the determination period includes a pulse waveform and/or a fixed cycle waveform having a fixed cycle following the pulse waveform.

Further, in the present invention, in the earthquake determination step, it may be determined that no earthquake has occurred, when a waveform of acceleration measured in the determination period includes a pulse waveform and/or a convergent waveform having a predetermined amplitude or less following the pulse waveform.

Further, in the present invention, in the earthquake determination method described above, in the earthquake processing period, when an index value calculated in the index calculation step is equal to or larger than a predetermined threshold, a shut-off signal for shutting off an operation of a predetermined related device is output.

The earthquake determination method may further include: an impact determination step of determining an occurrence of an earthquake in the earthquake processing period; and a shut-off determination step of inhibiting output of the shut-off signal regardless of the index value, when it is determined that no earthquake has occurred in the impact determination step.

Further, in the present invention, a plurality of determination periods can be set. Then, when it is determined that no earthquake has occurred in the determination period, an occurrence of an earthquake may be further determined in the next determination period.

It should be noted that the contents described in MEANS FOR SOLVING THE PROBLEM can be combined as much as possible without departing from the problems and technical ideas of the present invention.

Effect of the Invention

According to the above invention, it is possible to more reliably suppress erroneous determination of noise as an earthquake, in the seismic sensor.

BRIEF DESCRIPTION OF THE DRAWINGS

FIG. 9 is a view showing variations of earthquake determination conditions in the seismic processing in Example 1.

FIGS. 13(a) and 13(b) are first graphs for explaining a fixed cycle determination method in Example 3.

FIGS. 14(a) and 14(b) are second graphs for explaining a fixed cycle determination method in Example 3.

FIGS. 20(a) and 20(b) are views showing a third example of an operation of the seismic sensor in which the power saving mode is not set, when acceleration due to a pulse impact is detected.

MODE FOR CARRYING OUT THE INVENTION

EXAMPLE 1

Hereinafter, a seismic sensor according to Example 1 of the present invention will be described with reference to the drawings. However, the example described below shows an example of a seismic sensor, and the seismic sensor according to the present invention is not limited to the following configuration.

[Device Configuration]

Figure 1:
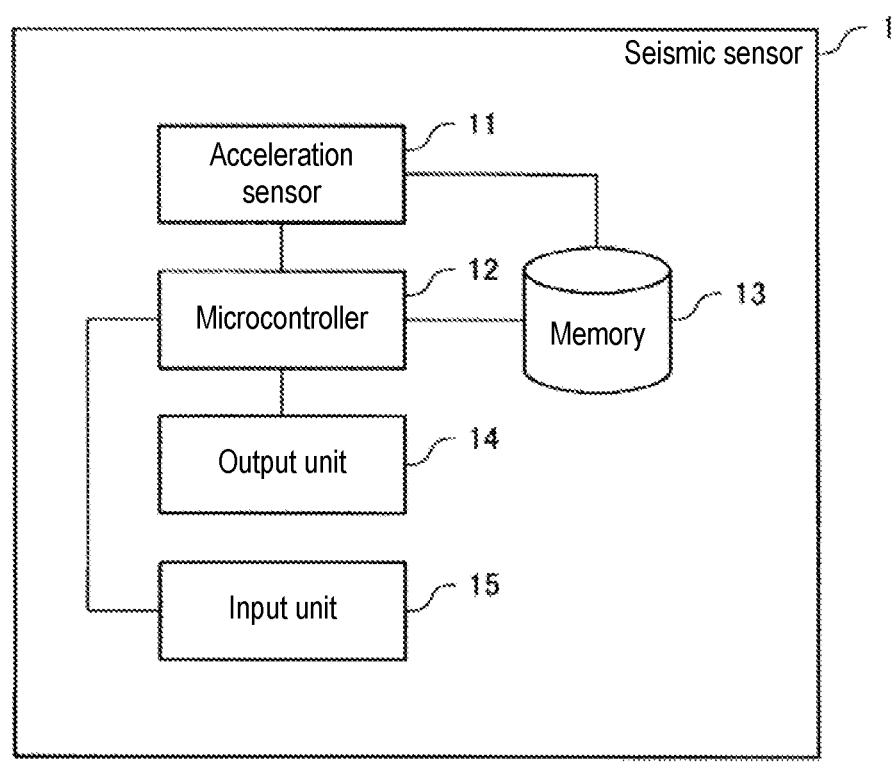
FIG. 1 is a device configuration diagram showing an example of a seismic sensor.

FIG. 1 is a device configuration diagram showing an example of a seismic sensor according to the embodiment. A seismic sensor 1 includes an acceleration sensor 11, a microcontroller 12, a memory 13, an output unit 14, and an input unit 15. The acceleration sensor 11 is, for example, an acceleration sensor using a piezoelectric element or an acceleration sensor that detects electrostatic capacity between electrodes. Note that acceleration measured (also referred to as "sampled") by the acceleration sensor 11 is output to the microcontroller 12. The microcontroller 12 is a general-purpose integrated circuit, for example. The microcontroller 12 acquires the acceleration measured by the acceleration sensor 11 at a predetermined cycle, and detects an occurrence of an earthquake and calculates an index value indicating a scale of the earthquake based on the acceleration.

Further, the microcontroller 12 operates in different forms, such as an active mode or a sleep mode, depending on the situation. The sleep mode is an operation mode that reduces power consumption as compared with the active mode, by the microcontroller 12 operating with limited functions, such as stopping execution of instructions while receiving interruptions, or stopping clock supply. In the active mode, the microcontroller 12 performs determination processing as to whether detected vibration is an earthquake or noise, and calculates an index value indicating a scale of the earthquake.

The memory 13 is a temporary memory such as a random access memory (RAM) or a non-volatile memory such as an erasable programmable read only memory (EPROM), and holds, for example, measured acceleration, a threshold used for earthquake determination, and the like. Note that the memory 13 may be a memory built in the acceleration sensor 11 or the microcontroller 12. Further, the output unit 14 is an output terminal included in the microcontroller 12, for example. For example, when it is determined that an earthquake has occurred, the microcontroller 12 outputs information indicating the occurrence of the earthquake and a scale thereof to another device via the output unit 14. Further, the input unit 15 is an input terminal included in the microcontroller 12. The microcontroller 12 may receive, for example, an operation of a switch (not shown) or a command input from another device via the input unit 15. Note that a high-pass filter (not shown) may be provided between the acceleration sensor 11 and the microcontroller 12 to remove a gravity component. Further, the microcontroller 12 may handle the acceleration measured by the acceleration sensor 11 by converting into an absolute value of the acceleration with a predetermined offset as a reference.

[Function Configuration]

Figure 2:
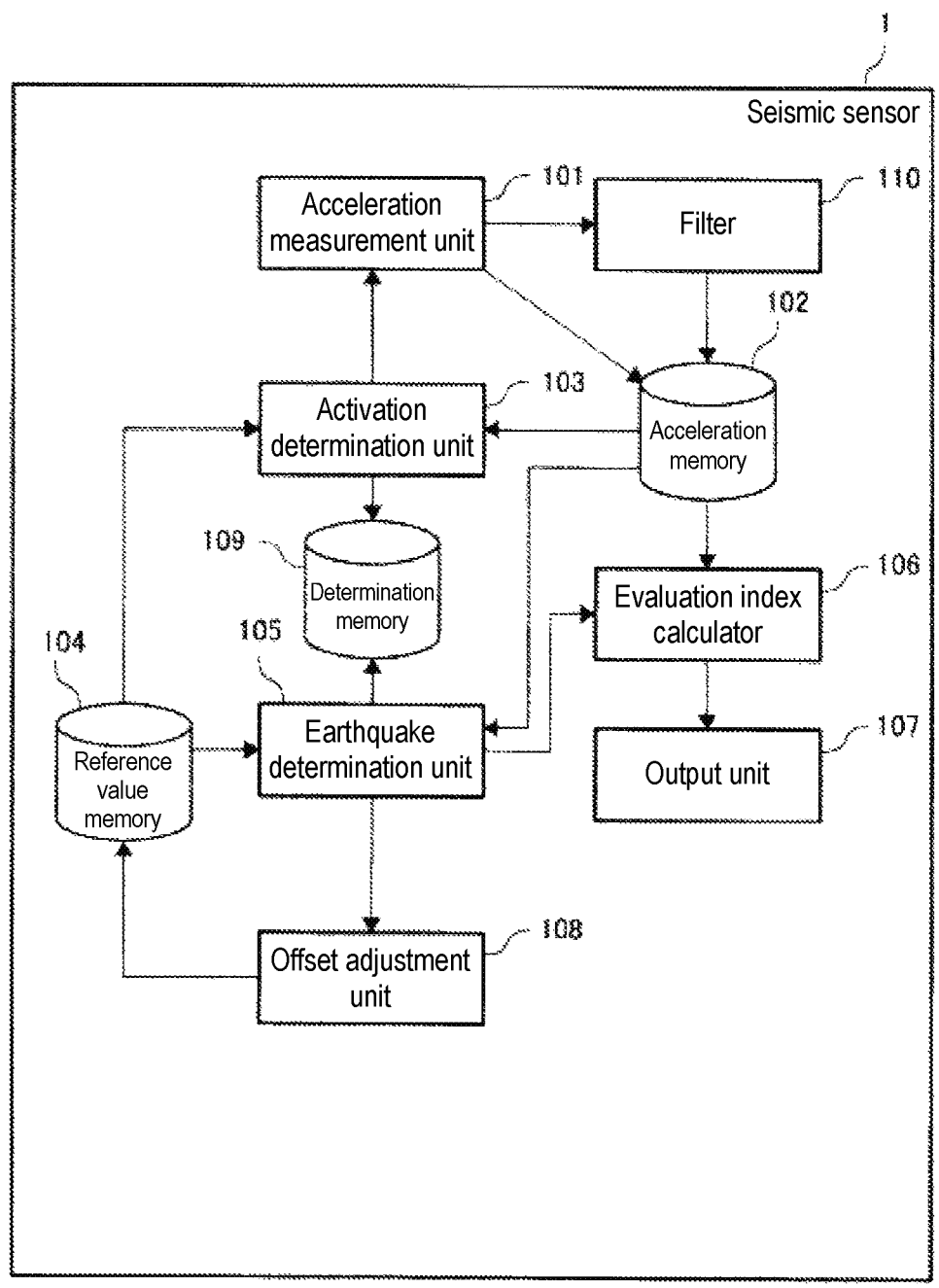
FIG. 2 is a functional block diagram showing an example of the seismic sensor.

FIG. 2 is a functional block diagram showing an example of the seismic sensor 1. The seismic sensor 1 includes an acceleration measurement unit 101, an acceleration memory 102, an activation determination unit 103, a reference value memory 104, an earthquake determination unit 105, an evaluation index calculator 106, an output unit 107, an offset adjustment unit 108, a determination memory 109, and a filter 110. Note that the acceleration measurement unit 101, the activation determination unit 103, the earthquake determination unit 105, the evaluation index calculator 106, the offset adjustment unit 108, and the filter 110 are realized by the acceleration sensor 11 or the microcontroller 12 shown in FIG. 1 operating based on a predetermined program. Further, the acceleration memory 102, the reference value memory 104, and the determination memory 109 are realized by the memory 13 in FIG. 1. Note that at least the earthquake determination unit 105 and the evaluation index calculator 106 are realized by the microcontroller 12 operating in the active mode. Further, the output unit 107 is realized by the microcontroller 12 and the output unit 14 of FIG. 1 operating based on a predetermined program.

The acceleration measurement unit 101 measures acceleration at a predetermined cycle. Note that the acceleration measurement unit 101 normally repeats the measurement of acceleration at a relatively low speed (that is, a relatively large measurement cycle). Moreover, when performing such low-speed sampling, the microcontroller 12 basically operates in the sleep mode. Such an operation state with low power consumption is also referred to as "standby state" or "power saving mode". In other words, the "standby state" is an operation state for performing low-speed sampling. At this time, since the microcontroller 12 operates in the sleep mode with limited functions, power consumption is suppressed.

Further, when the acceleration measurement unit 101 detects vibration larger than a threshold preset in the reference value memory 104, the acceleration measurement unit 101 repeats the acceleration measurement at a higher speed (that is, a relatively small cycle) than that in low-speed sampling. When performing such high-speed sampling, the microcontroller 12 operates in the sleep mode or the active mode. Note that, when the earthquake determination unit 105 or the evaluation index calculator 106 performs processing, the microcontroller 12 operates in the active mode. An operation state during such high-speed sampling is also referred to as "measurement mode", and shift of the operation state from the power saving mode to the measurement mode is also referred to as "activation". In other words, the "measurement mode" is an operation state for performing high-speed sampling. At this time, the microcontroller 12 may operate in the sleep mode with limited functions, and may also operate in the active mode enabling the operation with the maximum calculation capacity. In the measurement mode, the sampling cycle is shortened, and the microcontroller 12 switches from the sleep mode to the active mode, which increases power consumption than that in the power saving mode.

The filter 110 performs filtering processing on an acceleration value measured by the acceleration measurement unit 101, and causes the acceleration memory 102 to store the filtered acceleration. In the embodiment, the filter 110 functions as a so-called digital filter. An existing technique can be adopted as a specific method of the filtering. The filter 110 functions as a low-pass filter, for example, by calculating a moving average of absolute values of acceleration.

Further, the acceleration memory 102 holds the acceleration value measured by the acceleration measurement unit 101 or the acceleration value filtered by the filter 110. The activation determination unit 103 compares the acceleration value measured by the acceleration measurement unit 101 with an activation threshold stored in the reference value memory 104, and activates the power saving mode to the measurement mode when the acceleration value exceeds the activation threshold. Further, the earthquake determination unit 105 uses the acceleration measured by the acceleration measurement unit 101 in the measurement mode and a threshold preset in the reference value memory 104, to determine whether the measured acceleration indicates an earthquake or is noise. In the example, the earthquake determination unit 105 defines one or a plurality of determination periods after the activation determination unit 103 detects acceleration exceeding the activation threshold, and performs processing for each determination period.

When the earthquake determination unit 105 determines to be an earthquake, the evaluation index calculator 106 calculates an evaluation index indicating a scale of the earthquake. For example, a spectrum intensity (SI) value is calculated as an earthquake evaluation index. Then, the output unit 107 outputs the calculated SI value to an external device. In addition, in the external device, when it is determined that the earthquake is of a predetermined scale or more based on the SI value, for example, processing of shutting off energy supply such as gas or electricity may be performed.

Whereas, when the earthquake determination unit 105 determines that the vibration is noise, the offset adjustment unit 108 performs so-called offset adjustment. In the example, a noise component included in a measured acceleration, such as: a change amount in the measured value caused with a change of the sensor over time; a change amount in the measured value caused with a temperature change; or a change amount in the measured value caused with a direction change of gravitational acceleration with respect to the sensor when a position of the installed sensor tilts for some reason, is called an offset component. The offset adjustment unit 108 calculates, for example, a median value of maximum and minimum acceleration values determined as noise or an average value of the acceleration, as the offset component.

Figure 3:
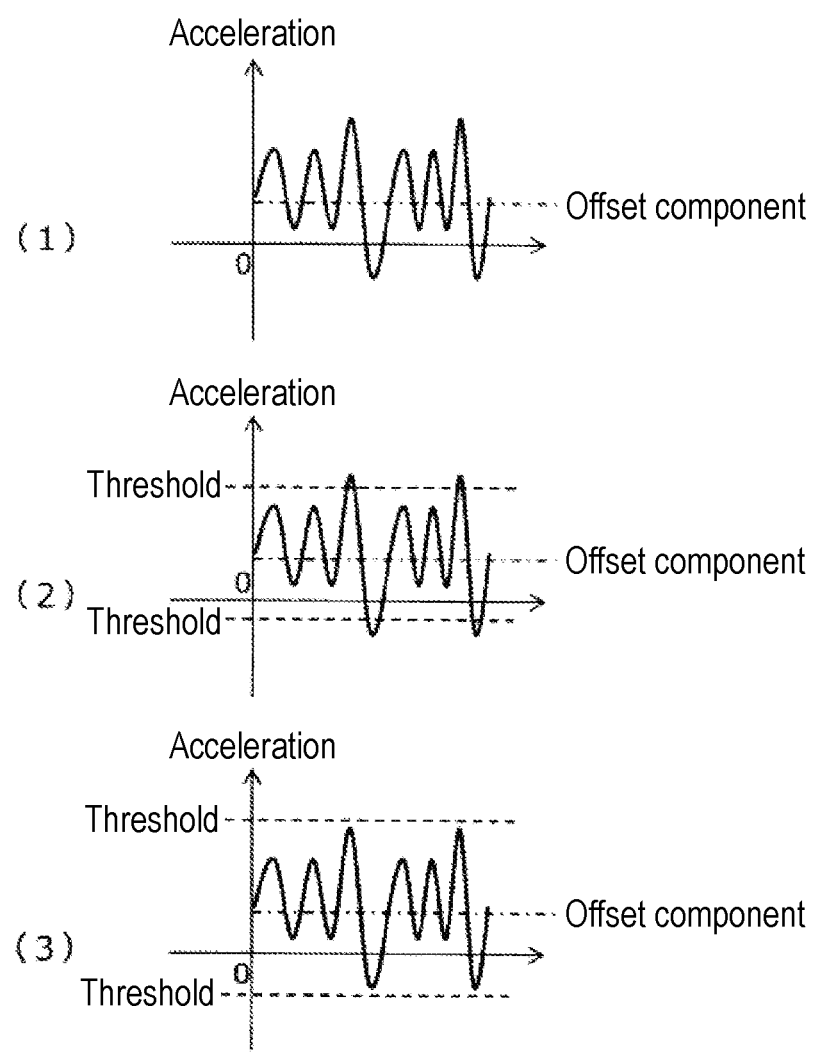
FIGS. 3(1) to 3(3) are views for explaining acceleration measured in the embodiment and thresholds.

FIGS. 3(1) to 3(3) are views for explaining acceleration measured in the embodiment, an offset component, and a threshold. In the graphs of FIGS. 3(1) to 3(3), a vertical axis indicates magnitude of acceleration, and a horizontal axis indicates a lapse of time. When vibration indicated by a thick solid line is measured as shown in FIG. 3(1), the offset component can be obtained as an average value of acceleration as indicated by a one dotted chain line, for example. The calculated offset component is stored in the reference value memory 104, and used for activation determination executed by the activation determination unit 103, and earthquake determination executed by the earthquake determination unit 105. Further, as shown in FIGS. 3(2) and 3(3), when vibration indicated by a thick solid line is measured, the threshold is defined as a value relative to the offset component as indicated by a broken line.

[Seismic Processing]

Figure 4:
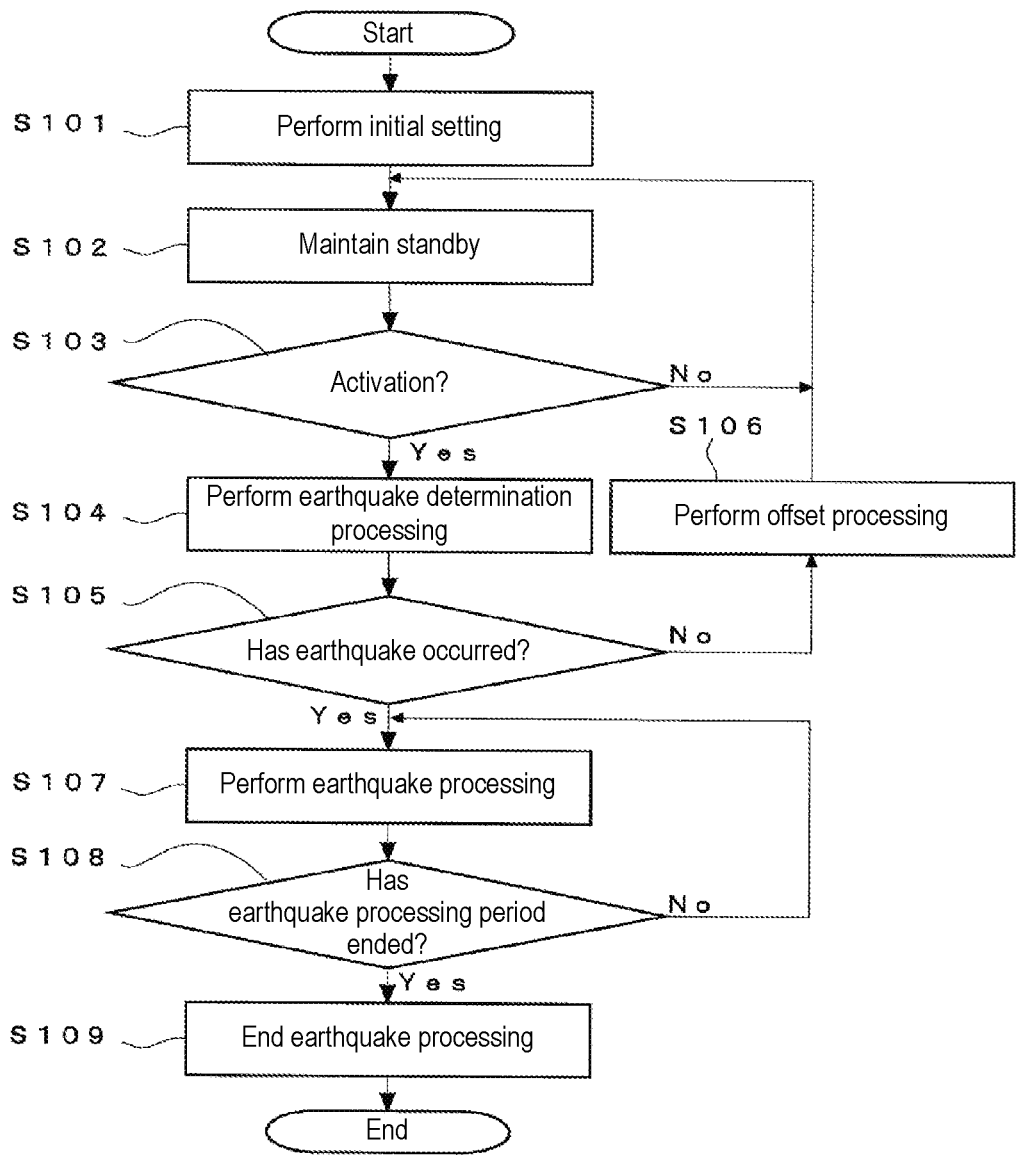
FIG. 4 is a processing flowchart showing an example of conventional seismic processing in the seismic sensor.

FIG. 4 is a processing flowchart showing an example of conventional seismic processing by the seismic sensor 1 described above. The seismic processing by the seismic sensor 1 is processing of shifting from the standby state (power saving mode) to the measurement mode to perform earthquake determination processing when acceleration of a predetermined level or higher is detected, further shifting to earthquake processing when it is determined that an earthquake has occurred, and causing output of a shut-off signal to a related device when a scale of the earthquake is a certain level or higher. This routine is repeatedly and continuously executed by the seismic sensor 1. When this routine is executed, first, in S101, a threshold (reference value) value and the like stored in the reference value memory 104 and used for the seismic processing is initially set. When the processing of S101 ends, the process proceeds to S102. In S102, the standby state is maintained. More specifically, the acceleration measurement unit 101 of the seismic sensor 1 measures acceleration in the power saving mode. In the standby state, the acceleration measurement unit 101 performs low-speed sampling. When the processing of S102 ends, the process proceeds to S103. In S103, the activation determination unit 103 of the seismic sensor 1 determines whether or not to activate (that is, shift to the measurement mode).

In this step, when the acceleration measured in S102 is equal to or less than the threshold (also referred to as "activation threshold") shown in FIGS. 3(1) to 3(3) (S103: NO), the process returns to S102, to continue the standby state (power saving mode). Here, the activation threshold is a value representing acceleration such as 50 gal, for example, and is initially set in S101 and held in the reference value memory 104. Whereas, when the acceleration measured in the standby state of S102 is larger than the threshold shown in FIGS. 3(1) to 3(3) (S103: YES), the acceleration measurement unit 101 shifts to the earthquake determination processing (measurement mode) in S104. Note that, as shown in FIGS. 3(2) and 3(3), the activation threshold is a relative value with the offset as a reference. Further, in the earthquake determination processing (measurement mode), the acceleration measurement unit 101 performs high-speed sampling.

Further, in the earthquake determination processing of S104, the acceleration measurement unit 101 measures acceleration by high-speed sampling in the earthquake determination processing (measurement mode), the filter 110 performs the above-described filtering processing on the measured acceleration, the acceleration memory 102 stores a value of the result, and the evaluation index calculator 106 starts calculation of a predetermined evaluation index. Note that the filtering may be executed by the microcontroller 12 after shifting to the active mode, or may be executed by the acceleration sensor 11 while the microcontroller 12 remains in the sleep mode. Note that the filtering is not essential in the earthquake determination processing. Moreover, the processing of S104 corresponds to a conventional earthquake determination step.

Further, at this time, as the evaluation index, for example, calculation of an SI value is started. The SI value is an example of the earthquake evaluation index, and is a value that is recognized to be correlated with a degree of damage to a building. Note that the output unit 107 of the seismic sensor 1 outputs the calculated evaluation index to another device in a later step. Specifically, the SI value can be obtained by the following Equation (1).

[Formula 1]

$$SI = \frac{1}{2.4} \int_{0.1}^{2.5} Sv(T, h) dT \qquad (1)$$

The SI value described above is an index representing destructive power of earthquake motion with an average of integral values of a speed response spectrum between 0.1 sec and 2.5 sec, which is a natural period of a highly rigid structure. Note that Sv is a speed response spectrum, T is a cycle, and h is an attenuation constant.

When a predetermined determination period has elapsed in the earthquake determination processing of S104, the process proceeds to S105. In S105, it is determined whether or not an earthquake has occurred. More specifically, the earthquake determination unit 105 determines whether the acceleration value measured in the earthquake determination processing in S104 satisfies a predetermined condition. For example, the earthquake determination unit 105 determines that an earthquake has occurred, when a difference between a maximum value and a minimum value of acceleration measured in the determination period is 100 gal or more.

When it is determined in S105 that an earthquake has occurred (S105: YES), the process proceeds to the earthquake processing in S107. Whereas, when it is determined in S105 that no earthquake has occurred (S105: NO), the process proceeds to offset processing in S106. In this offset processing, the offset adjustment unit 108 of the seismic sensor 1 adjusts the above-described offset. In this step, as an offset, for example, there is obtained an average value of the acceleration indicated by a one dotted chain line in FIG. 3(1). In this way, a threshold reference is adjusted. When the processing of S106 ends, the process returns to the standby state of S102.

In S107, the evaluation index calculator 106 of the seismic sensor 1 calculates an evaluation index indicating a scale of the earthquake. Note that, in calculating the evaluation index, the microcontroller 12 operates in the active mode. The evaluation index can be calculated as the SI value of the above-described Equation (1). Then, when the evaluation index calculated here is larger than a threshold, it is determined that an earthquake of an estimated strength or more has occurred, and the evaluation index (SI value) is output to an external device (not shown) provided with the seismic sensor 1. Then, the shut-off signal for shutting off energy supply such as gas or electricity is output from the external device, to shut off the gas or the electricity. When the processing of S107 ends, the process proceeds to S108. Note that the step of calculating the SI value in the processing of S107 corresponds to an index calculation step. (This index calculation step may include a SI value calculation step in the earthquake determination processing.)

In S108, it is determined whether or not an earthquake processing period has ended. This earthquake processing period is a period that is initially set in S101 in advance, and may be a period such as 120 seconds, for example. When it is determined in S108 that the earthquake processing period has not yet ended, the process returns to the processing before S107 to continue the earthquake processing. Whereas, when it is determined in S108 that the earthquake processing period has ended, the process proceeds to S109. In S109, the earthquake processing ends, the SI value calculation also stops, and the SI value is reset. When the processing of S109 ends, the processing of this routine temporarily ends.

However, in the conventional seismic processing as described above, even when a pulse impact is detected due to, for example, human-based vibration and the like instead of a continuous vibration such as an earthquake, there has been a case where a shut-off signal is output during earthquake processing on the assumption that an earthquake has occurred.

Figure 5:
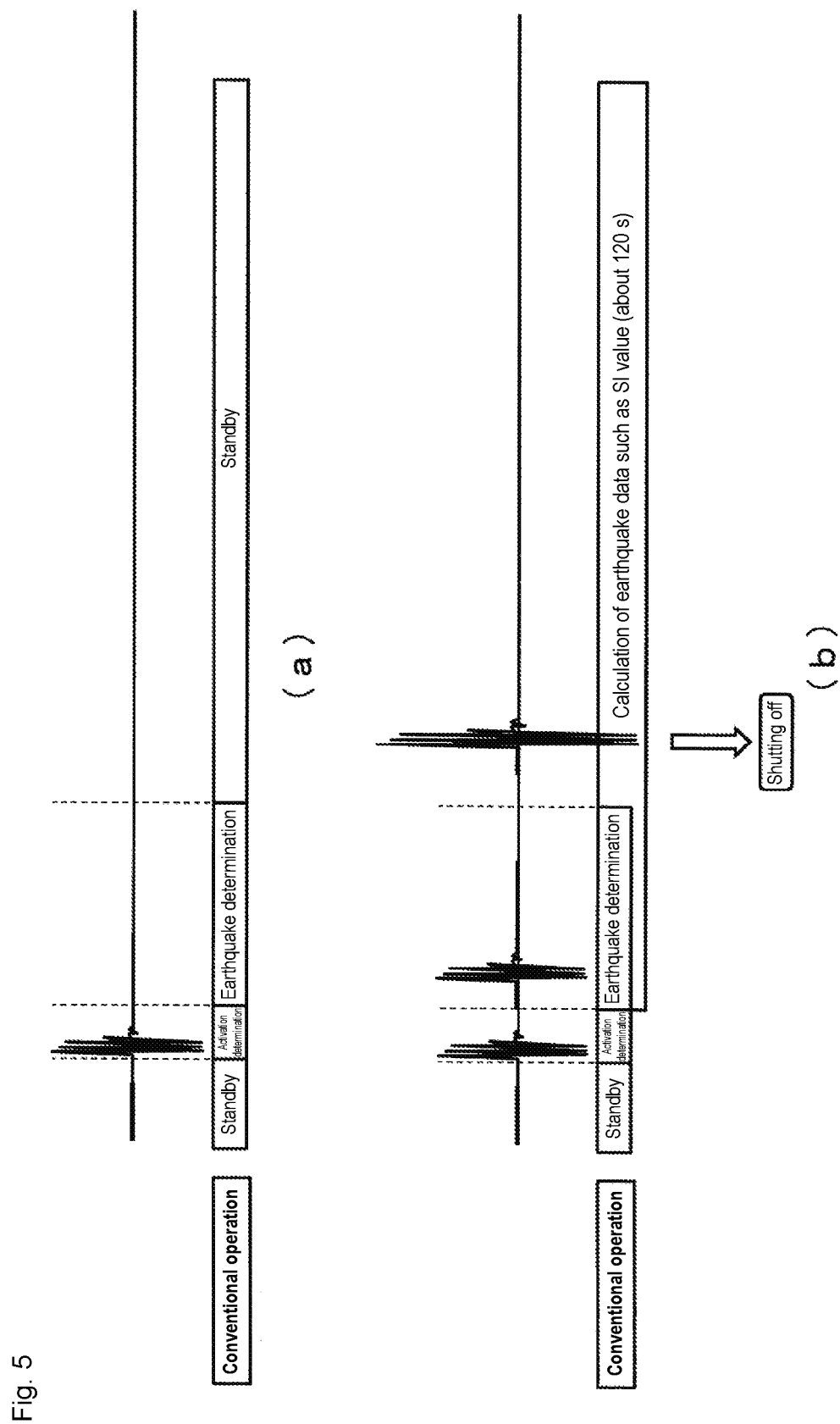
FIGS. 5(a) and 5(b) are views showing an operation of a seismic sensor with conventional seismic processing when acceleration due to a pulse impact is detected.

FIGS. 5(a) and 5(b) are views showing a response state of a conventional seismic sensor to a pulse impact. As shown in FIG. 5(a), when a pulse impact is detected only once in the standby state, the process temporarily shifts to the earthquake determination processing (measurement mode). However, since it is not determined that an earthquake has occurred in the determination period, the process returns to the standby state when the earthquake determination processing ends. However, as shown in FIG. 5(b), when a pulse impact is detected for a plurality of times, there has been a case where an occurrence of an earthquake is erroneously determined. In other words, when a pulse impact is detected in the standby state, in the earthquake determination processing shifted from the standby state, and in the earthquake processing after the shifting from the earthquake determination processing, there has been a case where a shut-off signal is output during earthquake processing as a result.

In the example, the following processing is performed such that an occurrence of an earthquake is not erroneously determined even when a pulse impact is detected for a plurality of times as described above.

Figure 6:
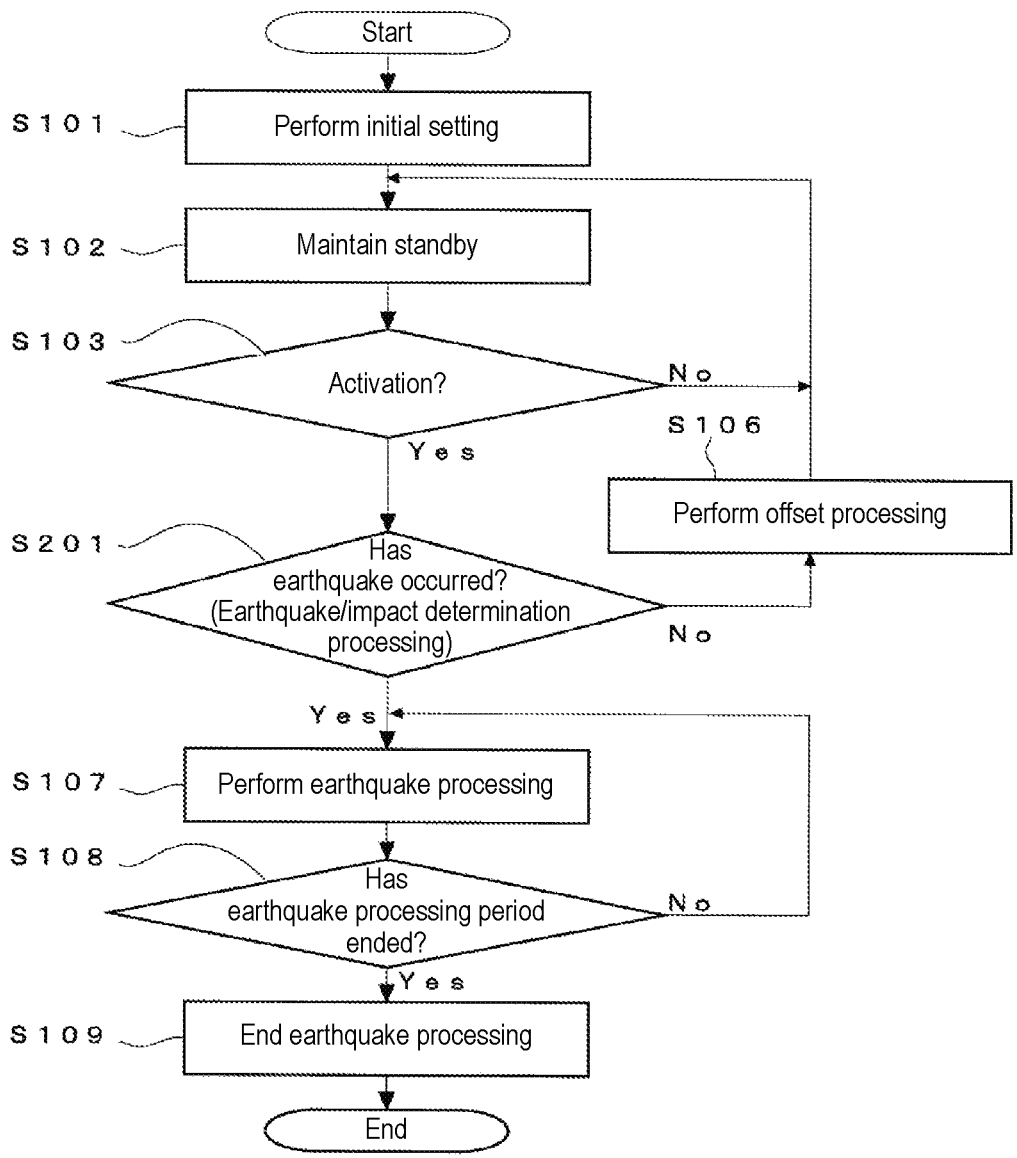
FIG. 6 is a processing flowchart showing an example of seismic processing by a seismic sensor according to Example 1 of the present invention.
Figure 7:
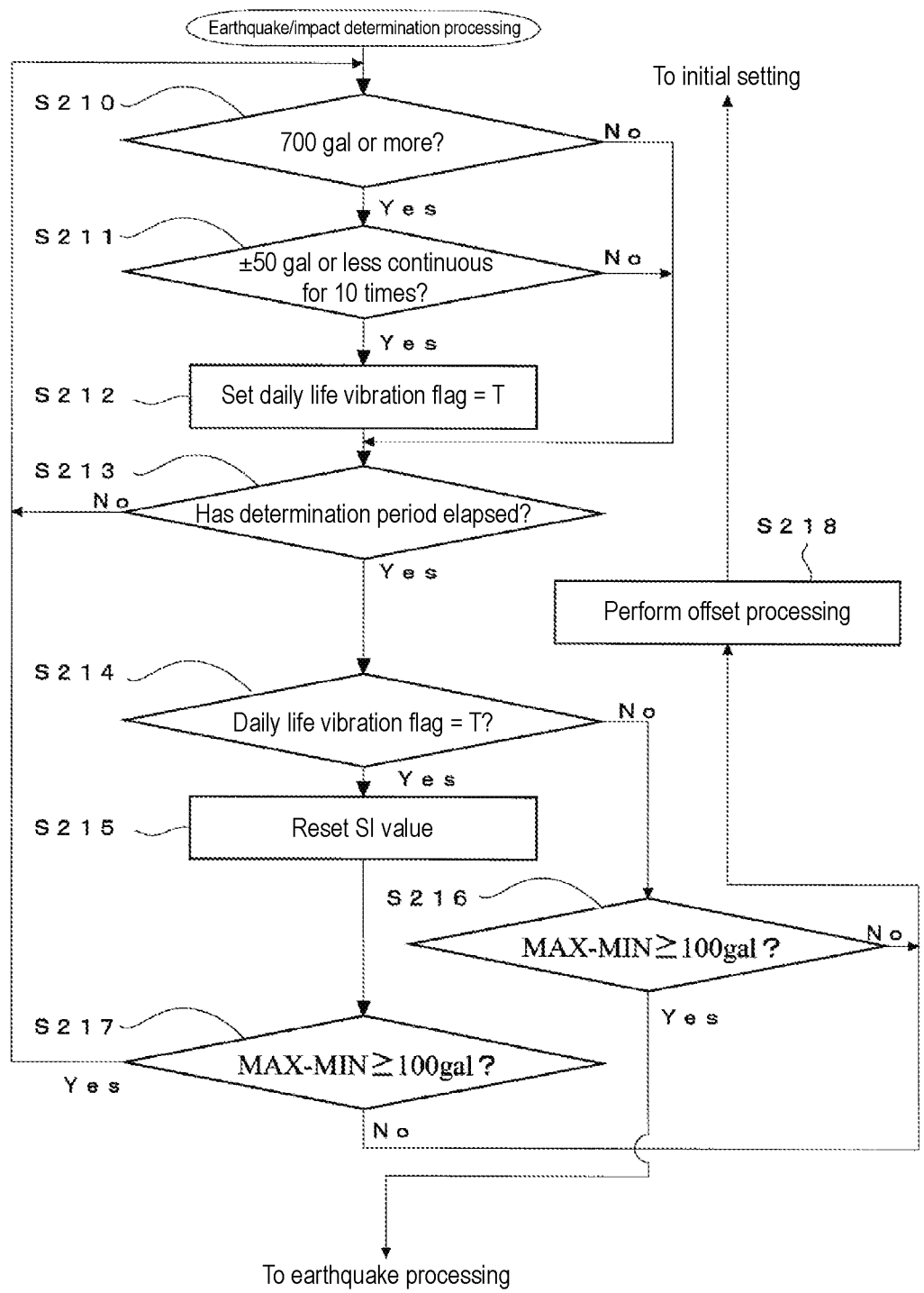
FIG. 7 is a processing flowchart showing an example of earthquake/impact determination processing according to Example 1 of the present invention.

FIG. 6 shows an example of the seismic processing in the example. the example is different from the conventional seismic processing shown in FIG. 4 in that earthquake/impact determination processing S201 including determination processing as to whether or not an earthquake has occurred is executed instead of the earthquake determination processing S104 and the determination processing S105 as to whether or not an earthquake has occurred. FIG. 7 shows a detailed flow of this earthquake/impact determination processing S201.

In the seismic processing in the example, when the standby state shifts to the measurement mode and the earthquake/impact determination processing starts, first, the process proceeds to S210, and it is determined whether or not acceleration of 700 gal or more has been detected in the determination period. Here, when it is determined that acceleration of 700 gal or more is not detected in the determination period (S210: NO), the process proceeds to S213 since the impact is determined not to be due to daily life vibration (due to human-based vibration). Whereas, when it is determined in S210 that the acceleration of 700 gal or more is detected in the determination period, the process proceeds to S211 since it is determined that an impact due to daily life vibration may have been detected.

In S211, it is determined whether or not acceleration of ±50 gal or less has been detected continuously for 10 times or more, after the acceleration of 700 gal or more is detected in the determination period. Here, when it is determined that acceleration of ±50 gal or less has been detected continuously for 10 times or more after the acceleration of 700 gal or more is detected (S211: YES), the process proceeds to S212 since the acceleration waveform is a waveform that converges sharply after a large pulse of a certain level or higher, and the pulse impact is determined to be caused by daily life vibration. Whereas, when the acceleration greater than ±50 gal is detected (S211: NO) at least once out of 10 detections after the acceleration of 700 gal or more is detected, the process proceeds to S213 since it is not determined as a pulse impact caused by daily life vibration.

In the processing of S212, a daily life vibration flag is set to T on the premise that the acceleration detected in the determination period is a pulse impact caused by daily life vibration. When the processing of S212 ends, the process proceeds to S213. In S213, it is determined whether or not the determination period has elapsed. When it is determined that the determination period has not yet elapsed (S213: NO), the process returns to before the processing of S210, and the detection of acceleration due to an earthquake/impact and the determination as to whether daily life vibration or not are continued. Whereas, when it is determined in S213 that the determination period has elapsed (S213: YES), the process proceeds to S214.

In S214, it is determined whether or not the daily life vibration flag is set to T. Here, when it is determined that the daily life vibration flag is set to T (S214: YES), the process proceeds to S215 since the detected acceleration is determined to be caused by daily life vibration. Whereas, when it is determined that the daily life vibration flag is not set to T (S214: NO), the process proceeds to S216 since it is determined that an earthquake may have occurred.

In S215, the SI value calculated so far is reset. When the processing of S215 ends, the process proceeds to S217. In S216, it is determined whether or not a difference obtained by subtracting a minimum value from a maximum value of acceleration detected in the determination period is 100 gal or more. When affirmative determination is made here, the process shifts to the earthquake processing since it is determined that an earthquake has occurred. Whereas, when negative determination is made, it is determined that no earthquake has occurred, and thus the process proceeds to S218, and the process returns to the initial setting processing after the offset processing is performed.

Further, also in S217, it is determined whether or not a difference obtained by subtracting a minimum value from a maximum value of acceleration detected in the determination period is 100 gal or more. Here, when affirmative determination is made, the process returns to before the process before S210, and the earthquake/impact determination processing is continued since a large acceleration has been detected while being determined to be caused by daily life vibration. Whereas, when negative determination is made in S217, it is determined that no earthquake has occurred, and thus the process proceeds to S218, and the process returns to the initial setting processing after the offset processing is performed.

Figure 8:
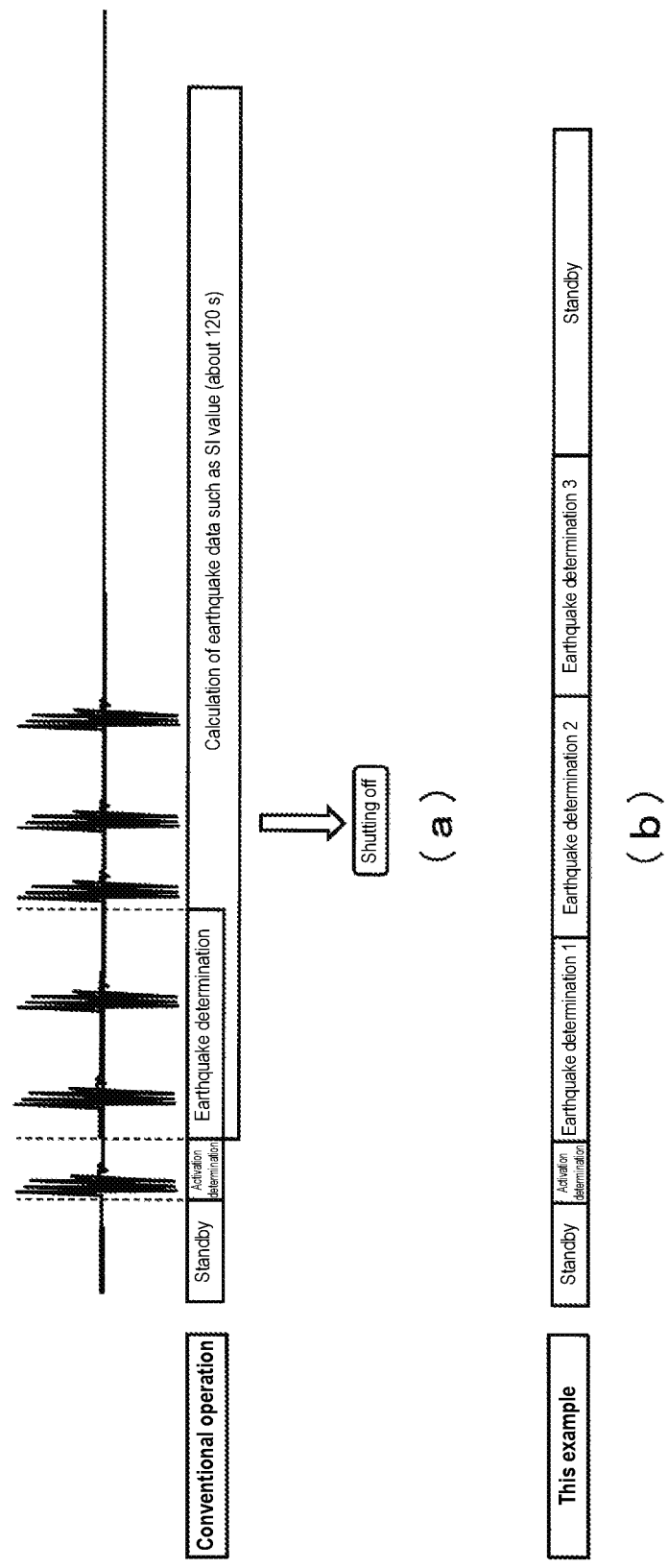
FIGS. 8(a) and 8(b) are views showing an operation of the seismic sensor according to Example 1 when acceleration due to a pulse impact is detected.

FIGS. 8(a) and 8(b) show an operation in a case where a pulse impact is repeatedly detected in the conventional seismic processing and the seismic processing in the example. FIG. 8(a) shows an operation of the conventional seismic processing, while FIG. 8(b) shows an operation of the seismic processing in the example. As shown in FIG. 8(a), in the conventional seismic processing, shift is made to the measurement mode in response to detection of a pulse impact in the standby state. Then, it is determined that an earthquake has occurred in response to further detection of a pulse impact in the determination period. Then, the shut-off signal is output since the SI value calculated in earthquake processing exceeds a threshold. Whereas, in the seismic processing in the example, the earthquake/impact determination processing is repeated in a plurality of determination periods during repeated detection of pulse impacts, and the process returns to the standby state when a pulse impact is no longer detected. Thus, in the seismic processing in the example, it is possible to suppress output of an unnecessary shut-off signal when a pulse impact caused by the daily seismic intensity is erroneously determined as an occurrence of an earthquake. Note that, in the example, the above earthquake/impact determination processing corresponds to the earthquake determination processing.

Moreover, in the earthquake/impact determination processing shown in FIG. 7, there have been used three conditions of (1) is the detected acceleration 700 gal or more? (2) has acceleration of ±50 gal or less been detected continuously for 10 times after acceleration of 700 gal or more has been detected? and (3) is a difference obtained by subtracting a minimum value from a maximum value of acceleration detected in a determination period 100 gal or more? Then, depending on whether or not these conditions are satisfied, it has been determined whether to continue the earthquake/impact determination processing, shift to the earthquake processing, or return to the standby process. However, the present invention is not necessarily limited to the processing of making the above determination using all the conditions (1) to (3). Note that the condition of (2) has acceleration of ±50 gal or less been detected continuously for 10 times after acceleration of 700 gal or more has been detected? intends to detect, as an impact, a waveform that sharply converges after a large pulse.

FIG. 9 shows variations when the determination condition in the earthquake/impact determination processing is changed depending on whether or not to adopt the above condition (1) is the detected acceleration 700 gal or more? and on whether or not to repeat the determination period of the earthquake/impact determination for a plurality of times. As shown below, the present invention is assumed to be also applicable to seismic processing in which the determination period of the earthquake/impact determination is limited to one time, in addition to the seismic processing on the assumption that the determination period of the earthquake/impact determination is repeated for a plurality of times.

In a pattern of repeatedly executed determination period with the condition of 700 gal or more, which is a pattern in the first quadrant in FIG. 9, the pulse impact is determined to be caused by daily life vibration in a case where: a maximum acceleration of 700 gal or more is detected in a first determination period; a difference obtained by subtracting a minimum value from a maximum value of acceleration detected in the determination period is less than 100 gal; and the maximum acceleration of 700 gal or more is detected and then acceleration of ±50 gal or less is detected continuously for 10 times or more. Then, in a case of a pulse impact caused by daily life vibration, the earthquake determination is repeated. Further, in a case of a pulse impact caused by daily life vibration, the SI value is reset once.

In a pattern of one time determination period with the condition of 700 gal or more, which is a pattern in the second quadrant in FIG. 9, the pulse impact is determined to be caused by daily life vibration and the process returns to a standby state in a case where, in the first determination period, a maximum acceleration of 700 gal or more is detected, and then later acceleration of ±50 gal or less is detected continuously for 10 times or more. These two conditions have priority over the condition that a difference obtained by subtracting a minimum value from a maximum value of acceleration detected in the determination period is less than 100 gal.

In a pattern of one time determination period without the condition of 700 gal or more, which is a pattern in the third quadrant in FIG. 9, the pulse impact is determined to be caused by daily life vibration and the process returns to a standby state, in a case where a difference obtained by subtracting a minimum value from a maximum value of acceleration detected in the first determination period is less than 100 gal, or acceleration of ±50 gal or less is detected continuously for 10 times or more. However, in a case where a difference obtained by subtracting a minimum value from a maximum value of acceleration detected in the first determination period is less than 100 gal, and acceleration of ±50 gal or less is detected continuously for 10 times or more, the offset value is not updated (offset processing is not performed).

In a pattern of repeatedly executed determination period without the condition of 700 gal or more, which is a pattern in the fourth quadrant in FIG. 9, the pulse impact is determined to be caused by daily life vibration in a case where, in a first determination period, a difference obtained by subtracting a minimum value from a maximum value of detected acceleration is less than 100 gal, and acceleration of ±50 gal or less is detected continuously for 10 times or more. Then, in a case of a pulse impact caused by daily life vibration, the earthquake determination is repeated. Further, in a case of a pulse impact caused by daily life vibration, the SI value is reset once. Note that, in Example 1 above, the description has been given to an example of determining that no earthquake has occurred when a waveform of acceleration measured in the determination period includes a pulse waveform and a convergent waveform having a predetermined amplitude or less following the pulse waveform. However, it may be determined that no earthquake has occurred, when a waveform of acceleration measured in the determination period includes only a pulse waveform.

EXAMPLE 2

Next, Example 2 of the present invention will be described. Example 2 of the present invention is an example having two determination conditions of (4) is a difference obtained by subtracting a minimum value from a maximum value of acceleration detected in a determination period 100 gal or more? and (5) is acceleration of 500 gal or more at a cycle of 0.04 sec or less made? instead of the determination conditions (1) to (3) in the earthquake/impact determination processing in Example 1.

Figure 10:
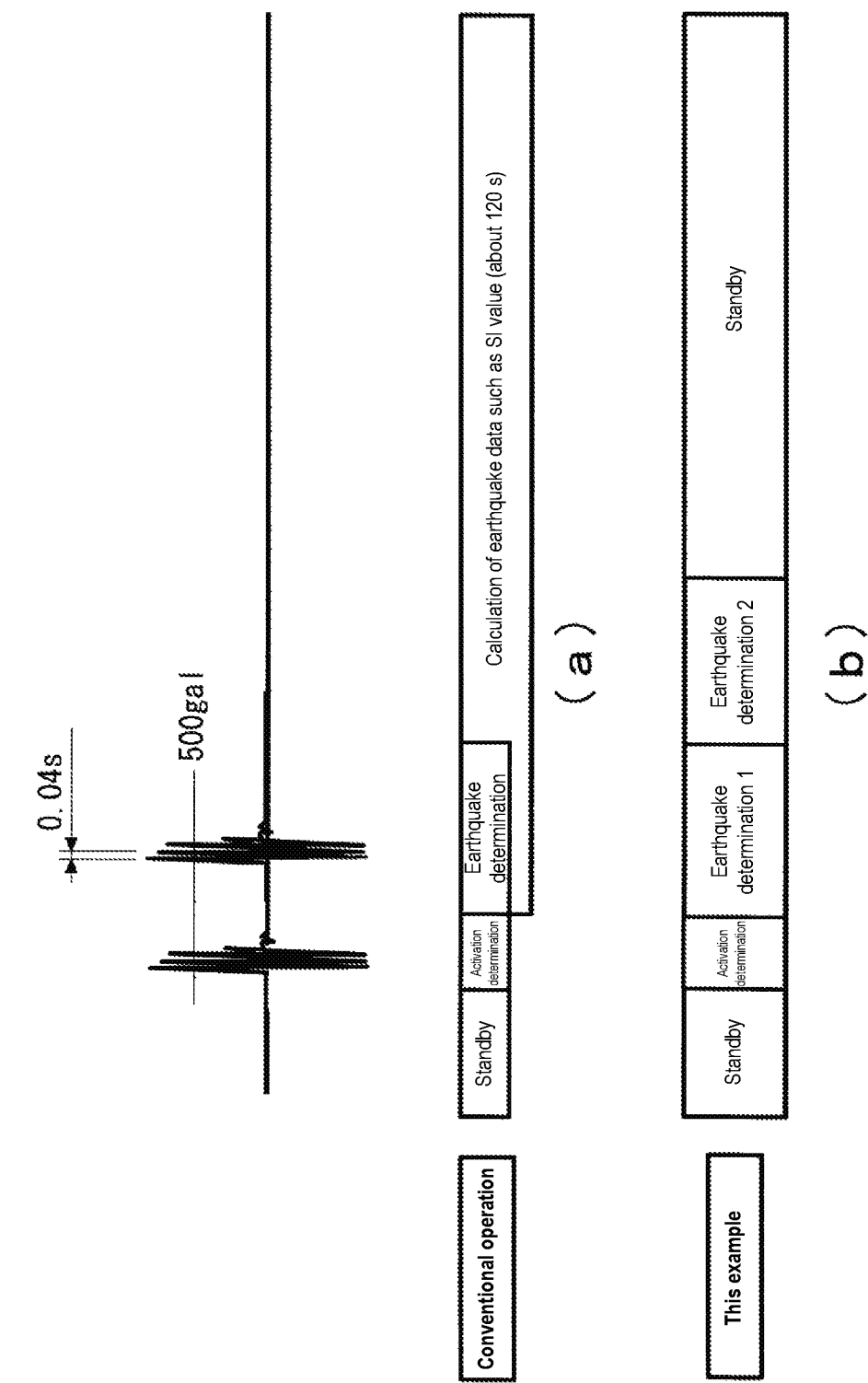
FIGS. 10(a) and 10(b) are views showing an operation of a seismic sensor according to Example 2 when acceleration due to a pulse impact is detected.

More specifically, as shown in FIGS. 10(a) and 10(b), in a first determination period, when both of the condition (4) is a difference obtained by subtracting a minimum value from a maximum value of acceleration detected in a determination period 100 gal or more? and the condition (5) is acceleration of 500 gal or more at a cycle of 0.04 sec or less detected? are satisfied, the process shifts to the next determination period.

In a second determination period, determination is made only on the condition (4) is a difference obtained by subtracting a minimum value from a maximum value of acceleration detected in a determination period 100 gal or more? Then, when (4) is satisfied, the process proceeds to the next determination period. Then, the determination is repeated in the next determination period until the impact converges and the condition (4) is no longer satisfied, and the process returns to the standby state at the time of convergence.

Note that, in the example, the condition as to whether or not acceleration of 500 gal or more at a cycle of 0.04 sec or less is detected is based on a purpose of determining an impact depending on a shape of the waveform itself. Instead of this condition, a condition as to whether or not acceleration of 1500 gal or more is detected once may be used. Moreover, for the cycle here, a half cycle of a waveform may be used as a cycle. A method of obtaining the cycle may be a method of obtaining a time difference between waveform top Peaks as described later, or the cycle may be obtained by frequency resolution such as FFT. Further, the acceleration value here may be an absolute value, or may be a value of maximum value−minimum value in a certain section.

EXAMPLE 3

Next, Example 3 of the present invention will be described. In Example 3 of the present invention, a description is given to an example in which, when fixed cyclic acceleration is detected after detection of a pulse impact, the acceleration is determined as the impact and vibration based on daily life vibration.

Figure 11:
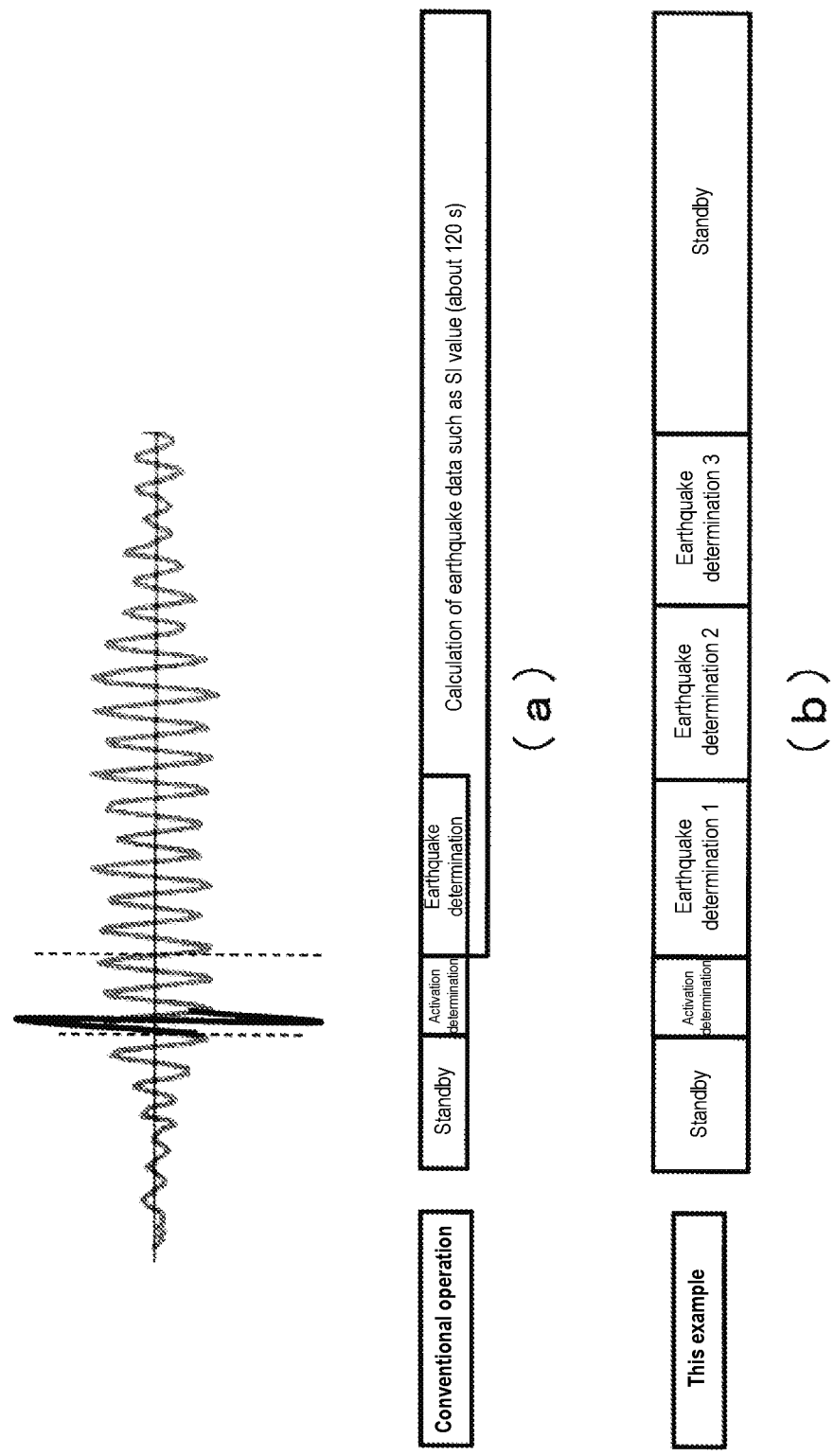
FIGS. 11(a) and 11(b) are views showing an operation of a seismic sensor according to Example 3 when acceleration due to a pulse impact is detected.

FIGS. 11(a) and 11(b) show an example of an acceleration waveform that is a target of the example, and an example of an operation of a seismic sensor 1 in that case. FIG. 11(a) shows an operation by conventional seismic processing, while FIG. 11(b) shows an operation by seismic processing according to the example. Further, FIG. 12 shows determination conditions according to the example.

As shown in FIGS. 11(a) and 11(b), in the example, a case is assumed where fixed frequency vibration based on a natural frequency of the environment where the seismic sensor is installed continues after a pulse impact is detected.

Figure 12:
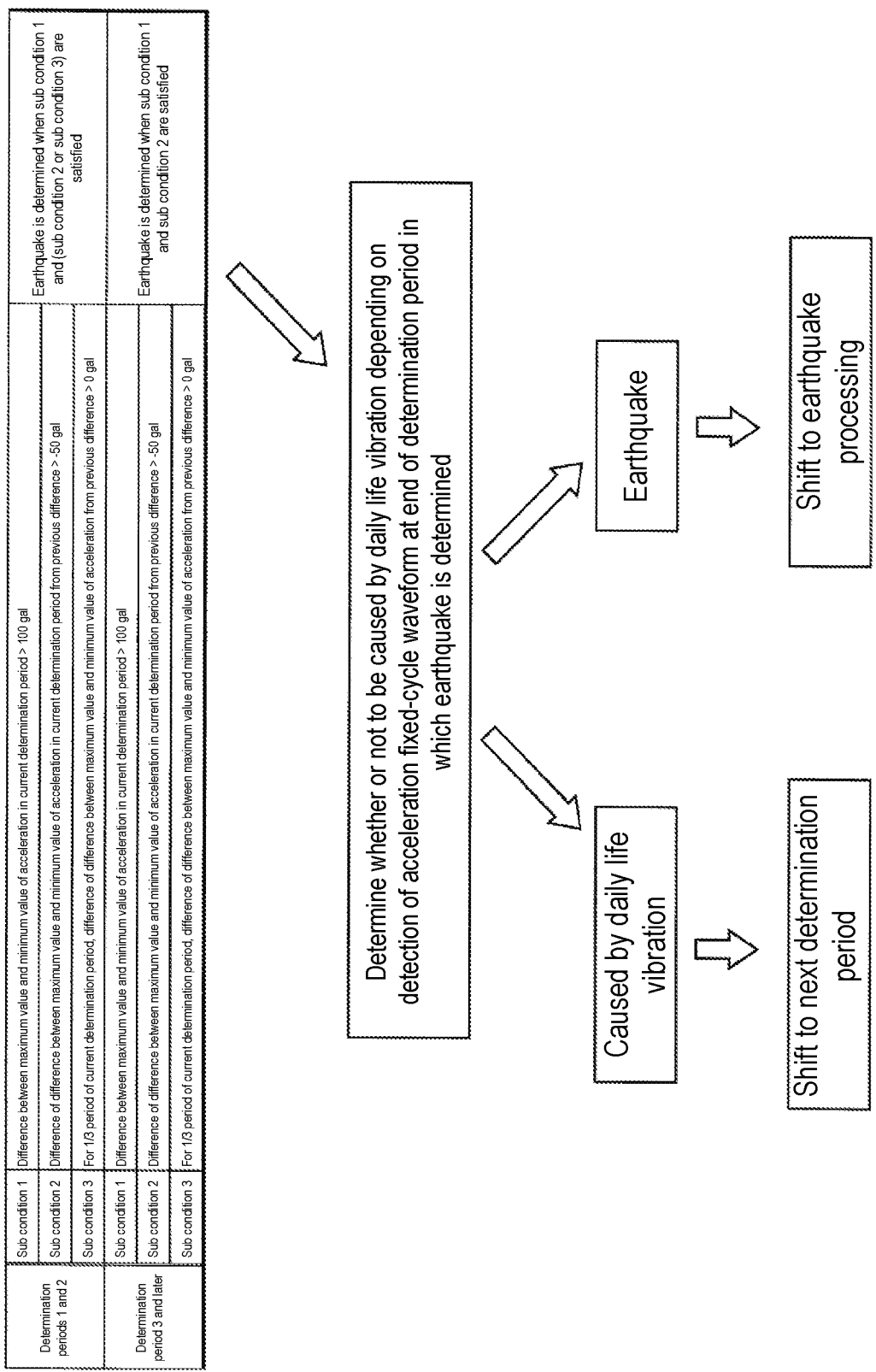
FIG. 12 is a view for explaining earthquake determination conditions and operations in Example 3.

As shown in FIG. 12, the determination conditions in this case are: (4) is a difference obtained by subtracting a minimum value from a maximum value of acceleration detected in a determination period 100 gal or more? (6) is a difference of a difference between a maximum value and a minimum value of acceleration in the current determination period from that in a previous determination period >−50 gal? and (7) for a ⅓ period of a current determination period, is a difference of a maximum value and a minimum value of acceleration from those of a previous ⅓ period >0 gal? Then, for first and second determination periods, it is determined that an earthquake has occurred when (4) and ((6) or (7)) are satisfied, while for the third and subsequent determination periods, it is determined that an earthquake has occurred when (4) and (6) are satisfied.

Furthermore, in the example, when a fixed cycle waveform of acceleration is detected at the end of the determination period in which an occurrence of an earthquake is determined, this is determined as an impact and vibration caused by daily life vibration, and the process shifts to the next determination period. Further, when a fixed cycle waveform of acceleration is not detected at the end of the determination period in which an occurrence of an earthquake is determined, the determination of the occurrence of an earthquake is confirmed as it is, and the process shifts to the earthquake processing.

When such processing is executed, in the conventional seismic processing in FIG. 11(a), the process shifts to the earthquake determination processing (measurement mode) in response to detection of a pulse vibration in the standby state, and the process shifts to earthquake processing in response to further detection of the fixed cycle waveform of acceleration also in the determination period. Thereafter, a shut-off signal will not be output when the fixed cycle waveform attenuates since the SI value will not increase, but there is a case where a shut-off signal is output depending on a size of the fixed cycle waveform.

Whereas, in the seismic processing according to the example of FIG. 11(b), shift is made to the earthquake/impact determination processing (measurement mode) when a pulse vibration is detected in the standby state. Then, in a first determination period and a second determination period of the measurement mode, the process shifts to the next determination period without shifting to the earthquake processing since the conditions for earthquake determination are satisfied but a fixed cycle waveform of acceleration is detected at the end of the determination period. Then, in a third determination period, the fixed cycle waveform of the acceleration attenuates, the earthquake determination condition is no longer satisfied, and the process returns to the standby state.

As described above, according to the example, when the fixed cycle waveform due to a pulse impact caused by daily life vibration and a natural vibration of the facility installed with the seismic sensor is large, it is possible to suppress output of a shut-off signal when an impact and vibration caused by the daily life vibration are erroneously determined as an earthquake.

FIGS. 13(a) and 13(b) and FIGS. 14(a) and 14(b) show detection conditions for a fixed cycle waveform of acceleration. The following conditions are used for detection.

a. As shown in FIG. 13(a), the waveform cycle is within a range of 0 to 0.1 sec.
b. As shown in FIG. 13(a), the waveform cycle is detected three times continuously within a fluctuation range of ±0.01 sec.
c. As shown in FIG. 13(b), the waveform top Peak is 10 gal or more.
d. As shown in FIG. 14(a), the cycle is detected five times continuously within a range of 0.1 sec to 0.14 sec.

Then, when (a and b and c) or d is satisfied in the above conditions a to d, it is detected that a fixed cycle waveform is generated. Note that, at that time, as shown in FIG. 14(b), a point at which inclination (or differential value) of acceleration (gal) changes from + to − is called a top Peak, and a time difference between the peaks Peak is taken as a cycle. Further, a point at which acceleration (gal) changes from − to + is called a bottom Peak, and the condition that the waveform bottom Peak is −10 gal or less may be, as the condition e, combined with the above "(a and b and c) or d". Moreover, a time difference between bottom Peaks is taken as a cycle. Further, a difference between the top Peak and the next bottom Peak may be taken as a cycle, or a difference between the bottom Peak and the next top Peak may be taken as a cycle. Further, in determining a top Peak value, when the top Peak value is a predetermined cycle or less, it can be considered as an error and can be ignored even when the top Peak value does not satisfy the condition c, for example. The same applies to the bottom Peak. In addition, it is possible to perform frequency resolution with FFT or equivalent signal processing, and obtain this cycle from the frequency component indicating a peak value. Further, the numerical values in the above conditions a to d are only examples, and can be changed as appropriate. Regarding a method of combining the above conditions a to d, various changes are possible in addition to the combination of (a and b and c) or d. Further, the conditions exemplified in the above Examples 1 to 3 may be combined. Furthermore, for example, the combination may be such as: the cycle continues six times or more within a fluctuation range of ±0.01 sec, and there are a total of X or more cycles of 0.01 sec, and there are a total of Y or more cycles of 0.02 sec, and there are a total of Z or more cycles of 0.1 sec. Note that, in Example 3 above, the description has been given to an example of determining that no earthquake has occurred when a waveform of acceleration measured in the determination period includes a pulse waveform and a fixed cycle waveform having a fixed cycle following the pulse waveform. However, it may be determined that no earthquake has occurred, when a waveform of acceleration measured in the determination period includes only a pulse waveform or includes only a fixed cycle waveform having a fixed cycle. Further, the waveform of the acceleration may be a waveform when a pulse impact is detected in a state where some vibration is generated.

EXAMPLE 4

Next, Example 4 of the present invention will be described. the example describes an example in which it is determined that an earthquake has occurred during a determination period of earthquake/impact determination processing (measurement mode), impact determination is continued even after shifting to earthquake processing, and a shut-off signal is not output regardless of an SI value when it is determined that an impact due to daily life vibration has been detected.

Figure 15:
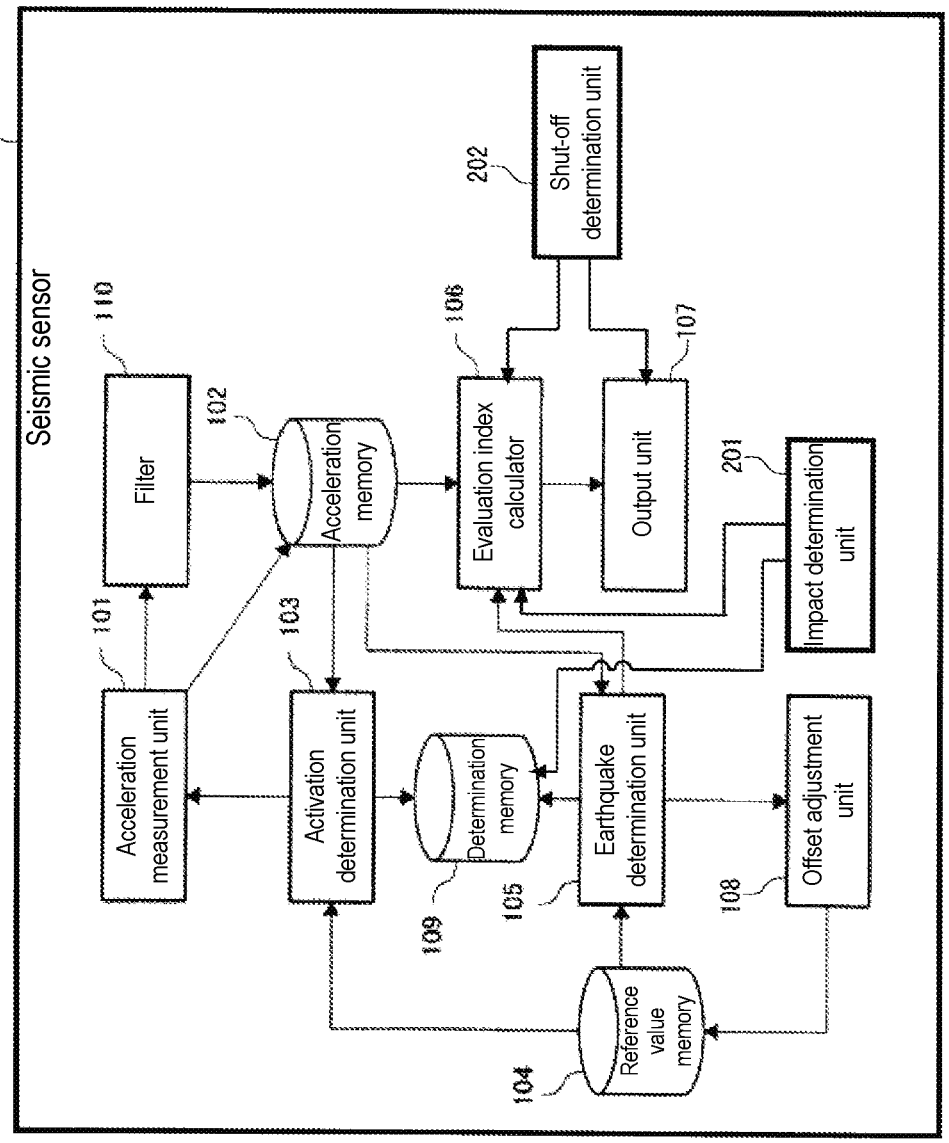
FIG. 15 is a functional block diagram showing an example of the seismic sensor in Example 4.

FIG. 15 shows a functional block diagram of a seismic sensor 21 in the example. The seismic sensor 21 in the example is different from the seismic sensor 1 shown in FIG. 2 in that the seismic sensor 21 has: an impact determination unit 201 configured to continue determination as to whether or not vibration is an impact caused by daily life vibration even after shifting to earthquake processing; and a shut-off determination unit 202 configured to inhibit output of a shut-off signal to an external device (not shown) when it is determined in the impact determination unit 201 that the vibration is an impact caused by daily life vibration, even in a case where shift is made to seismic processing and an earthquake evaluation index such as an SI value exceeds a threshold.

More specifically, the impact determination unit 202 continues determination as to whether or not a condition of a determination memory 109 is satisfied even after shifting to the earthquake processing. At this time, the condition of the determination memory 109 may be the condition used in the earthquake/impact determination processing in the Examples 1 to 3, or may be a different condition. Further, based on an earthquake evaluation index such as an SI value calculated by an evaluation index calculator 106, the shut-off determination unit 202 outputs a shut-off signal to an external device (not shown) in a case of an earthquake of a certain magnitude or larger, but does not output the shut-off signal when the condition for determining an impact caused by daily life vibration is satisfied in the impact determination unit 201.

Figure 16:
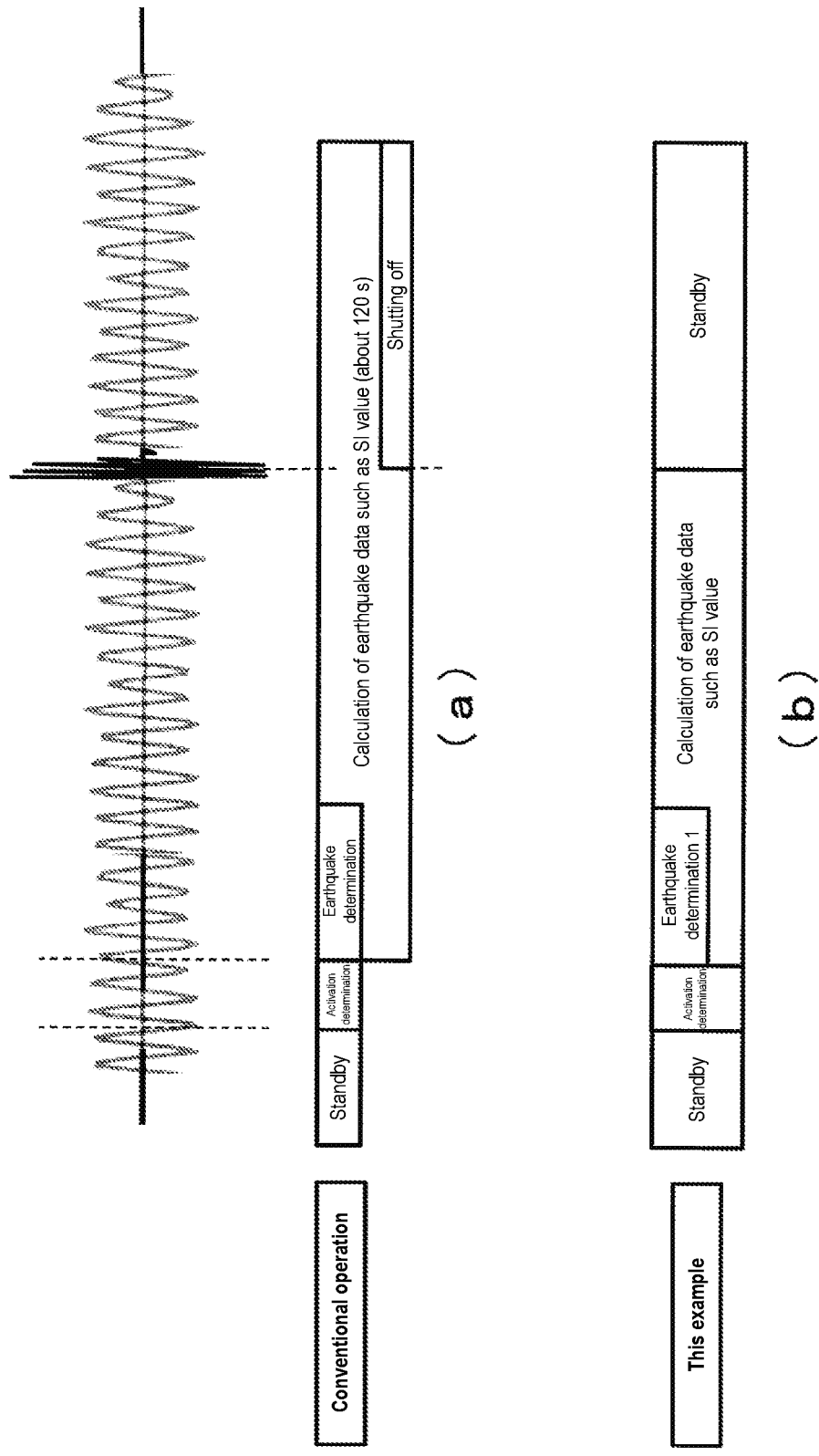
FIGS. 16(a) and 16(b) are views showing an operation of a seismic sensor according to Example 4 when acceleration due to a pulse impact is detected.

According to the above-mentioned seismic sensor 21, as also shown in FIGS. 16(a) and 16(b), it is determined as an impact caused by daily life vibration when a pulse impact waveform (for example, a pulse waveform of 500 gal or more at a cycle of 0.04 sec or less) is detected even after shifting to the earthquake processing. Then, a shut-off signal is not output even if the SI value satisfies the shut-off condition, the earthquake processing is forcibly ended, and the process returns to the standby state. Note that the impact determination unit 202 is not always necessary to return to the standby state after the shut-off determination unit 202 performs processing of not outputting the SI value to the external device and of inhibiting output of the shut-off signal, but may continue the earthquake processing as it is. Note that, in the example, a process in which the impact determination unit 202 continues the determination as to whether or not the condition of the determination memory 109 is satisfied even after shifting to the earthquake processing, corresponds to an impact determination step. In addition, a process in which, based on the earthquake evaluation index such as the SI value, the shut-off determination unit 202 outputs a shut-off signal to an external device (not shown) in a case of an earthquake of a certain magnitude or larger, but does not output the shut-off signal when the condition for determining an impact caused by daily life vibration is satisfied in the impact determination unit 201, corresponds to a shut-off determination step. Further, the content of the impact determination to be performed after shifting to the earthquake processing may use any determination condition in the Examples 1 to 3 described above or a combination thereof. In addition, based on the earthquake evaluation index such as the SI value, when the evaluation index is certain magnitude or larger and satisfies the condition of impact determination, the shut-off signal may be output in such a way that a higher-level system can recognize as a shut-off signal due to a factor other than an earthquake.

Note that the numerical values used for the conditions of the above-described examples are merely examples, and can be appropriately changed within a range consistent with the gist of the invention.

Figure 17:
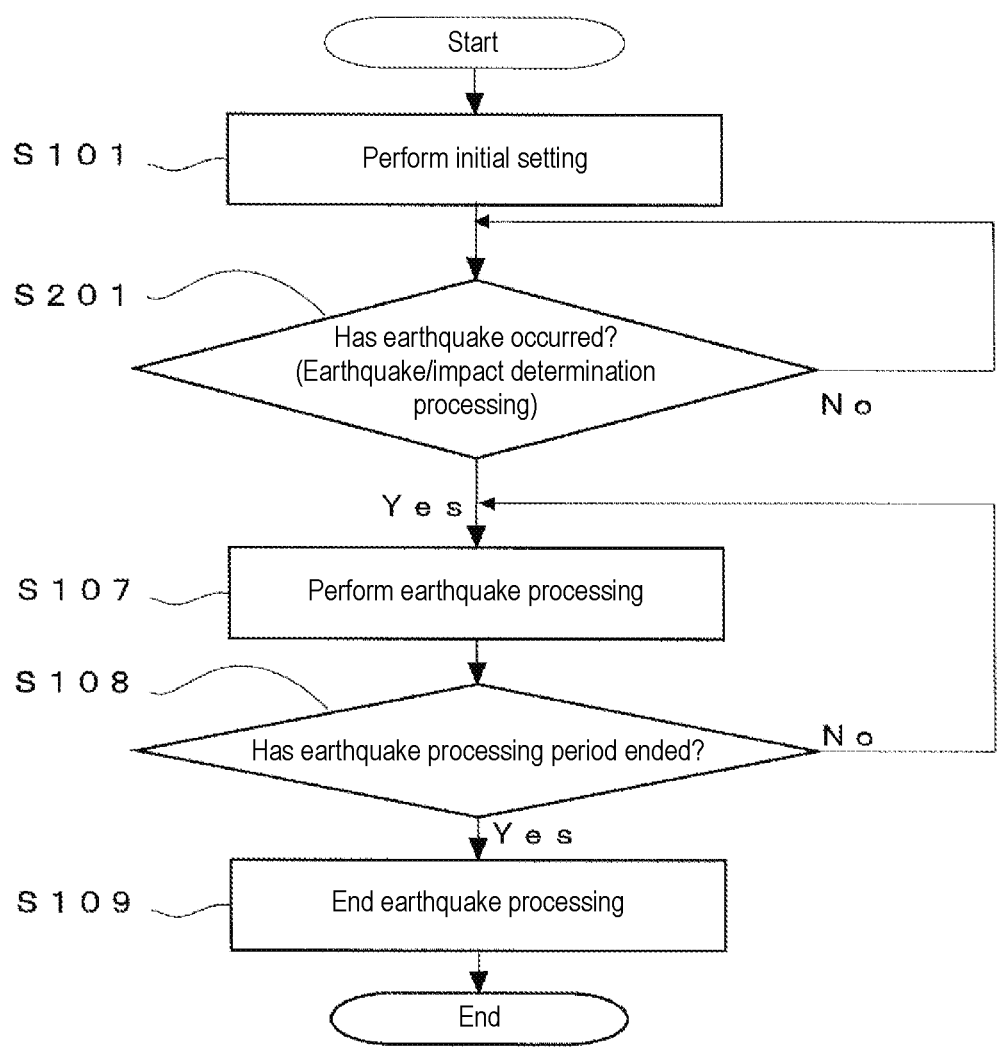
FIG. 17 is a processing flowchart showing an example of seismic processing in a seismic sensor in which a power saving mode is not set.

For example, the present invention is also applicable to a seismic sensor in which a power saving mode is not set. In this case, in the above example, the process of "when processing in the power saving mode is executed and acceleration measured in the power saving mode exceeds a threshold, the power saving mode is shifted to the measurement mode" is not necessary. FIG. 17 shows an example of a flowchart of seismic processing in the seismic sensor in which the power saving mode is not set. In this case, as compared with the flowchart of the seismic processing shown in FIG. 6, it can be seen that the processing of S102 of maintaining the standby state and the processing of S103 for the activation determination unit 103 of the seismic sensor 1 to determine whether or not to activate are omitted.

Figure 18:
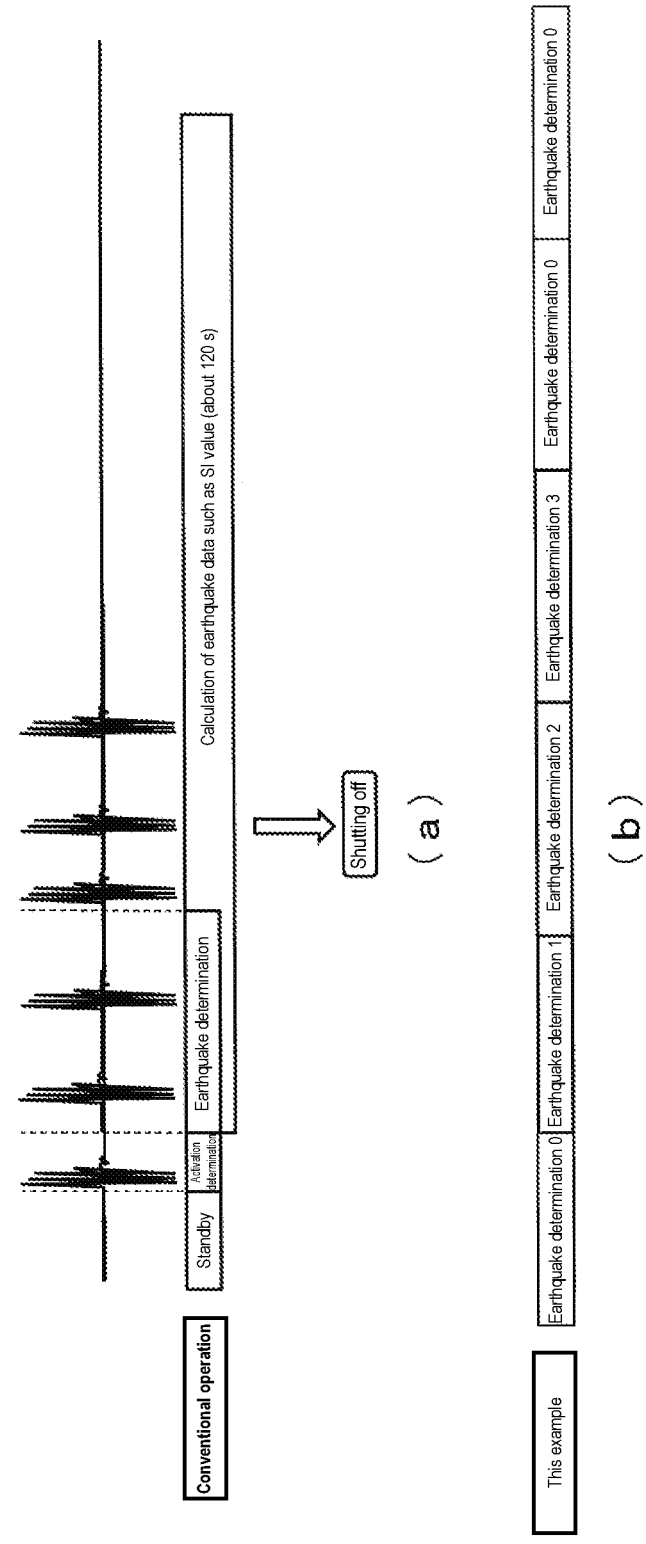
FIGS. 18(a) and 18(b) are views showing a first example of an operation of the seismic sensor in which the power saving mode is not set, when acceleration due to a pulse impact is detected.

Further, FIGS. 18(a) and 18(b) show an operation when a pulse impact is repeatedly detected in the seismic processing by the seismic sensor in which the power saving mode is not set. These are views when the seismic processing shown in FIGS. 8(a) and 8(b) is applied to the seismic sensor in which the power saving mode is not set. In the seismic processing in FIG. 18(b), unlike the seismic processing shown in FIG. 8(b), there is no processing of the standby state and the activation determination, and the earthquake/impact determination processing is always executed. Then, the earthquake/impact determination processing is repeated in a plurality of determination periods during repeated detection of pulse impacts, and the earthquake/impact determination processing is further repeated even at a time when the pulse impact is no longer detected. Also in the seismic processing in FIG. 18(b), similarly to the seismic processing shown in FIG. 8(b), it is possible to suppress output of an unnecessary shut-off signal when a pulse impact caused by the daily seismic intensity is erroneously determined as an occurrence of an earthquake. Note that, in FIG. 18(b), the determination period may be uniform or may change (the same applies to the following example).

Figure 19:
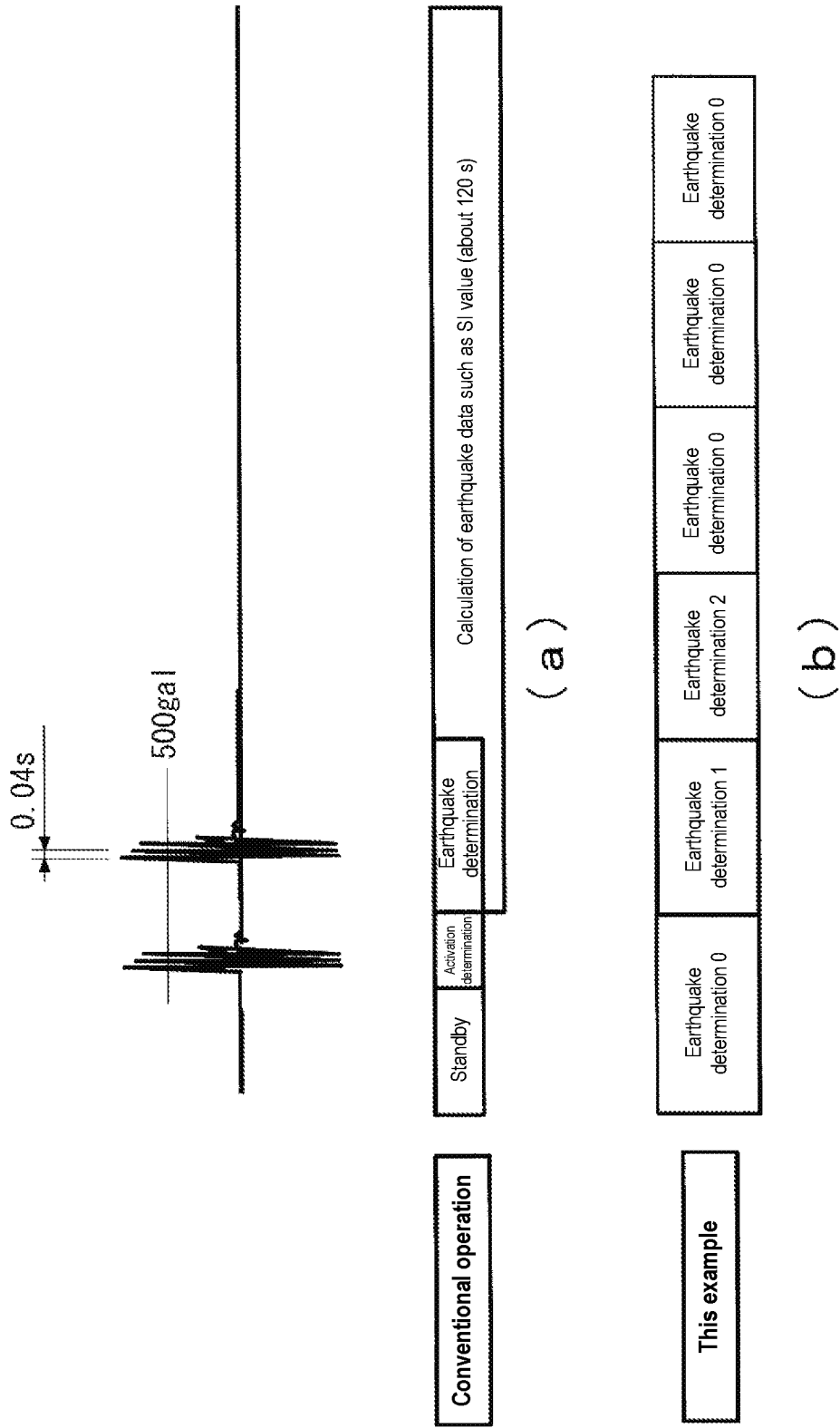
FIGS. 19(a) and 19(b) are views showing a second example of an operation of the seismic sensor in which the power saving mode is not set, when acceleration due to a pulse impact is detected.

Next, FIGS. 19(a) and 19(b) show an example in which, in the seismic processing by the seismic sensor in which the power saving mode is not set, a determination condition in the earthquake/impact determination processing is set to the two determination conditions of (4) is a difference obtained by subtracting a minimum value from a maximum value of acceleration detected in a determination period 100 gal or more? and (5) is acceleration of 500 gal or more at a cycle of 0.04 sec or less made? described with reference to FIGS. 10(a) and 10(b) in Example 2. In the seismic processing shown in FIG. 19(b), unlike in FIG. 10(b), there is no processing of the standby state and the activation determination, and the earthquake/impact determination processing is always executed. Then, in a determination period 1, when both of the condition (4) is a difference obtained by subtracting a minimum value from a maximum value of acceleration detected in a determination period 100 gal or more? and the condition (5) is acceleration of 500 gal or more at a cycle of 0.04 sec or less detected? are satisfied, the process shifts to a determination period 2, which is the next determination period.

In the determination period 2, determination is made only on the condition (4) is a difference obtained by subtracting a minimum value from a maximum value of acceleration detected in a determination period 100 gal or more? Then, when (4) is satisfied, the process proceeds to the next determination period. Then, the determination is repeated in the next determination period until the impact converges and the condition (4) is no longer satisfied, and further proceeds to the next determination period to continue the earthquake/impact determination processing without returning to the standby state even in a case of convergence.

Next, FIGS. 20(a) and 20(b) show processing in a case of determining acceleration as an impact and vibration based on daily life vibration when fixed cyclic acceleration is detected after detection of a pulse impact, in the seismic processing by the seismic sensor in which the power saving mode is not set. This relates to a case where the seismic processing described in Example 3 with reference to FIGS. 11(a) and 11(b) is applied to the seismic sensor in which the power saving mode is not set.

In the processing shown in FIG. 20(b), unlike the processing shown in FIG. 11(b), there is no processing of the standby state and the activation determination, and the earthquake/impact determination processing is always executed. Then, determination conditions in this case are: (4) is a difference obtained by subtracting a minimum value from a maximum value of acceleration detected in a determination period 100 gal or more? (6) is a difference of a difference between a maximum value and a minimum value of acceleration in the current determination period from that in a previous determination period >−50 gal? and (7) for a ⅓ period of a current determination period, is a difference of a maximum value and a minimum value of acceleration from those of a previous ⅓ period >0 gal? Then, for determination periods 1 and 2, it is determined that an earthquake has occurred when (4) and ((6) or (7)) are satisfied, while for a determination period 3 and subsequent determination periods, it is determined that an earthquake has occurred when (4) and (6) are satisfied.

Furthermore, in the seismic processing of FIG. 20(b), unlike the seismic processing shown in FIG. 11(b), the earthquake/impact determination processing is always executed. Then, when a fixed cycle waveform of acceleration is detected at the end of the determination period in which an occurrence of an earthquake is determined, this is determined as an impact and vibration caused by daily life vibration, and the process shifts to the next determination period. Further, when a fixed cycle waveform of acceleration is not detected at the end of the determination period in which an occurrence of an earthquake is determined, the determination of the occurrence of an earthquake is confirmed as it is, and the process shifts to the earthquake processing.

Then, in the seismic processing shown in FIG. 20(b), in the determination periods 1 and 2, the process shifts to the next determination period without shifting to the earthquake processing since the conditions for earthquake determination are satisfied but a fixed cycle waveform of acceleration is detected at the end of the determination period. Then, in the determination period 3, the fixed cycle waveform of the acceleration attenuates, and the earthquake determination condition is no longer satisfied. Even in this case, unlike the seismic processing of FIG. 11(b), the process proceeds to the next determination period to continue the earthquake/impact determination processing.

Figure 21:
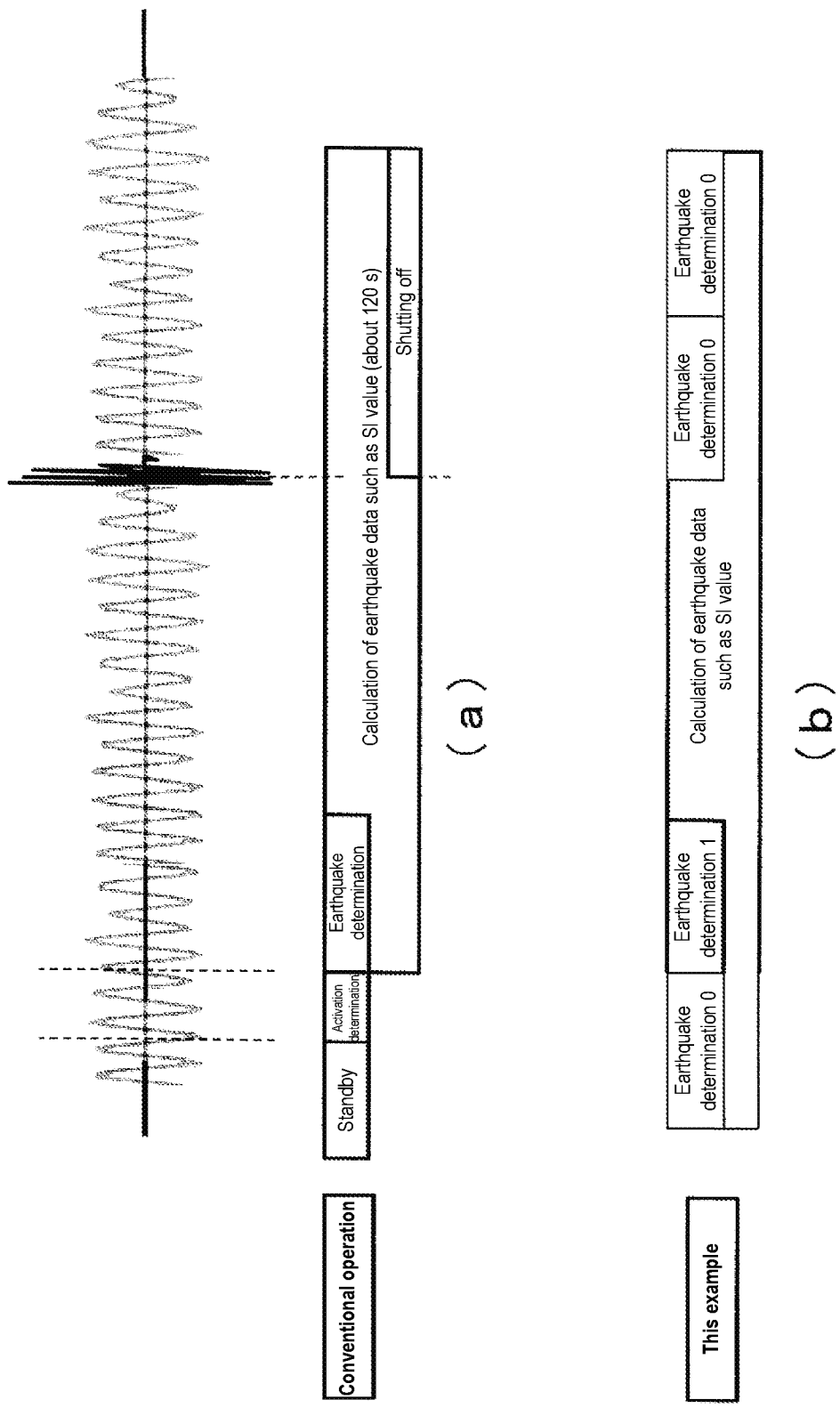
FIGS. 21(a) and 21(b) are views showing a fourth example of an operation of the seismic sensor in which the power saving mode is not set, when acceleration due to a pulse impact is detected.

Next, FIGS. 21(a) and 21(b) show an example in which a shut-off signal is not output regardless of the SI value, when it is determined that an earthquake has occurred in the determination period of the seismic processing by the seismic sensor in which the power saving mode is not set, impact determination is continued even after shifting to earthquake processing, and it is determined that an impact due to daily life vibration has been detected. This is a case where the seismic processing described in Example 4 with reference to FIGS. 16(a) and 16(b) is applied to the seismic sensor in which the power saving mode is not set.

In the example shown in FIG. 21(b), there is no processing of the standby state and the activation determination, and the earthquake/impact determination processing is always executed. Then, it is determined as an impact caused by daily life vibration when a pulse impact waveform (for example, a pulse waveform of 500 gal or more at a cycle of 0.04 sec or less) is detected even after shifting to the earthquake processing. Then, the shut-off signal is not output even if the SI value satisfies the shut-off condition, the earthquake processing is forcibly ended, and the next earthquake/impact determination processing is performed.

DESCRIPTION OF SYMBOLS 1 seismic sensor
11 acceleration sensor
12 microcontroller
13 memory
14 output unit
15 input unit
101 acceleration measurement unit
102 acceleration memory
103 activation determination unit
104 reference value memory
105 earthquake determination unit
106 evaluation index calculator
107 output unit
108 offset adjustment unit
109 determination memory
110 filter
201 impact determination unit
202 shut-off determination unit

The invention claimed is:

1. A seismic sensor comprising:
a measurement unit configured to measure acceleration;
an earthquake determination unit configured to determine whether or not an earthquake has occurred based on the acceleration measured in a determination period that is predetermined; and
an index calculator configured to calculate an index value indicating a scale of an earthquake in an earthquake processing period after the determination period, when the earthquake determination unit determines that an earthquake has occurred, wherein the earthquake determination unit determines an occurrence of an earthquake based on a difference between a maximum value and a minimum value of acceleration, and acceleration continuously measured for a predetermined number of times, wherein the earthquake determination unit is configured to set a plurality of determination periods, and when it is determined that no earthquake has occurred in each of the determination periods, an occurrence of an earthquake is further determined in a next determination period, and wherein the earthquake determination unit determines an occurrence of an earthquake based on a fact that a difference between a maximum value and a minimum value of acceleration measured in each of the determination periods is less than a predetermined value, and acceleration continuously measured for a predetermined number of times is equal to or less than a predetermined value.

2. The seismic sensor according to claim 1, wherein the seismic sensor operates in a power saving mode and a measurement mode with higher power consumption than that of the power saving mode, and shifts from the power saving mode to the measurement mode when acceleration measured by the measurement unit exceeds a predetermined threshold, and the determination period is a period after shifting to the measurement mode.

3. The seismic sensor according to claim 1, wherein, in the earthquake processing period, when an index value calculated by the index calculator is equal to or larger than a predetermined threshold, a shut-off signal for shutting off an operation of a related device provided with the seismic sensor is output, the seismic sensor further comprising:

an impact determination unit configured to determine an occurrence of an earthquake in the earthquake processing period; and a shut-off determination unit configured to inhibit output of the shut-off signal regardless of the index value, when the impact determination unit determines that no earthquake has occurred.

4. An earthquake determination method comprising:

an earthquake determination step of measuring acceleration and determining whether or not an earthquake has occurred based on the acceleration measured in a determination period that is predetermined; and an index calculation step of calculating an index value indicating a scale of an earthquake in an earthquake processing period after the determination period, when it is determined that an earthquake has occurred in the earthquake determination step, wherein in the earthquake determination step, an occurrence of an earthquake is determined based on a difference between a maximum value and a minimum value of acceleration, and acceleration continuously measured for a predetermined number of times, wherein a plurality of the determination periods can be set, and when it is determined that no earthquake has occurred in the determination period, an occurrence of an earthquake is further determined in a next determination period, and wherein, in the earthquake determination step, an occurrence of an earthquake is determined based on a fact that a difference between a maximum value and a minimum value of acceleration measured in each of the determination periods is less than a predetermined value, and acceleration continuously measured for a predetermined number of times is equal to or less than a predetermined value.

5. The earthquake determination method according to claim 4, wherein an occurrence of an earthquake is determined in a power saving mode and a measurement mode with higher power consumption than that of the power saving mode, shift is made from the power saving mode to the measurement mode when measured acceleration exceeds a predetermined threshold, and the determination period is a period after shifting to the measurement mode.

6. The earthquake determination method according to claim 4, wherein, in the earthquake processing period, when an index value calculated in the index calculation step is equal to or larger than a predetermined threshold, a shut-off signal for shutting off an operation of a predetermined related device is output, the earthquake determination method further comprising:

an impact determination step of determining an occurrence of an earthquake in the earthquake processing period; and a shut-off determination step of inhibiting output of the shut-off signal regardless of the index value when it is determined that no earthquake has occurred in the impact determination step.

* * * * *